United States Patent
Kasdorf et al.

(10) Patent No.: US 7,762,023 B2
(45) Date of Patent: Jul. 27, 2010

(54) MOUNTING SYSTEM FOR WORKSTATIONS

(75) Inventors: Dakota Kasdorf, Barrie (CA); Simon Stanescu, Toronto (CA)

(73) Assignee: Tayco Panelink Ltd, Toronto, Ontario (CA)

( * ) Notice: Subject to any disclaimer, the term of this patent is extended or adjusted under 35 U.S.C. 154(b) by 990 days.

(21) Appl. No.: 11/423,446

(22) Filed: Jun. 11, 2006

(65) Prior Publication Data

US 2007/0283630 A1    Dec. 13, 2007

(51) Int. Cl.
*E04B 2/56* (2006.01)
(52) U.S. Cl. .......................... 52/36.4; 52/36.5; 52/36.6; 52/282.2
(58) Field of Classification Search .................. 52/36.1, 52/36.4–36.6, 282.2
See application file for complete search history.

(56) References Cited

U.S. PATENT DOCUMENTS 3,866,364 A * 2/1975 Pollard ........................ 52/36.5
4,388,786 A * 6/1983 Gassler ....................... 52/282.2
4,731,960 A * 3/1988 Sease .......................... 52/36.6
6,185,887 B1 * 2/2001 Strassle ...................... 52/282.2
6,591,555 B2 * 7/2003 King et al. ................... 52/36.5
6,634,824 B2 * 10/2003 Liu ............................. 52/282.2
7,096,637 B2 * 8/2006 McMillan ................... 52/282.2

* cited by examiner

*Primary Examiner*—Richard E Chilcot, Jr.
*Assistant Examiner*—Matthew J Smith
(74) *Attorney, Agent, or Firm*—Patrick J. Hofbauer

(57) ABSTRACT

Among other things, a mounting system is provided comprising at least one column having top and bottom ends and defining a vertical axis. Each column has internal wall portions which define at least one channel therein extending parallel to its vertical axis, an outer channel portion opening to its exterior surface, and an inner channel portion extending inwardly. Mounting brackets, each having a first detent member, are positionable within the channel, and engagable with the internal wall portions for fixing themselves against rotation. A longitudinal rail member is slidably positionable within the channel parallel to the vertical axis and has a first set of indexing means arranged along it. At least one support bracket has a main body portion and a second set of one or more indexing means thereon matable with the first set so as to releasably mount the support bracket on the column in indexed relation thereto.

63 Claims, 29 Drawing Sheets

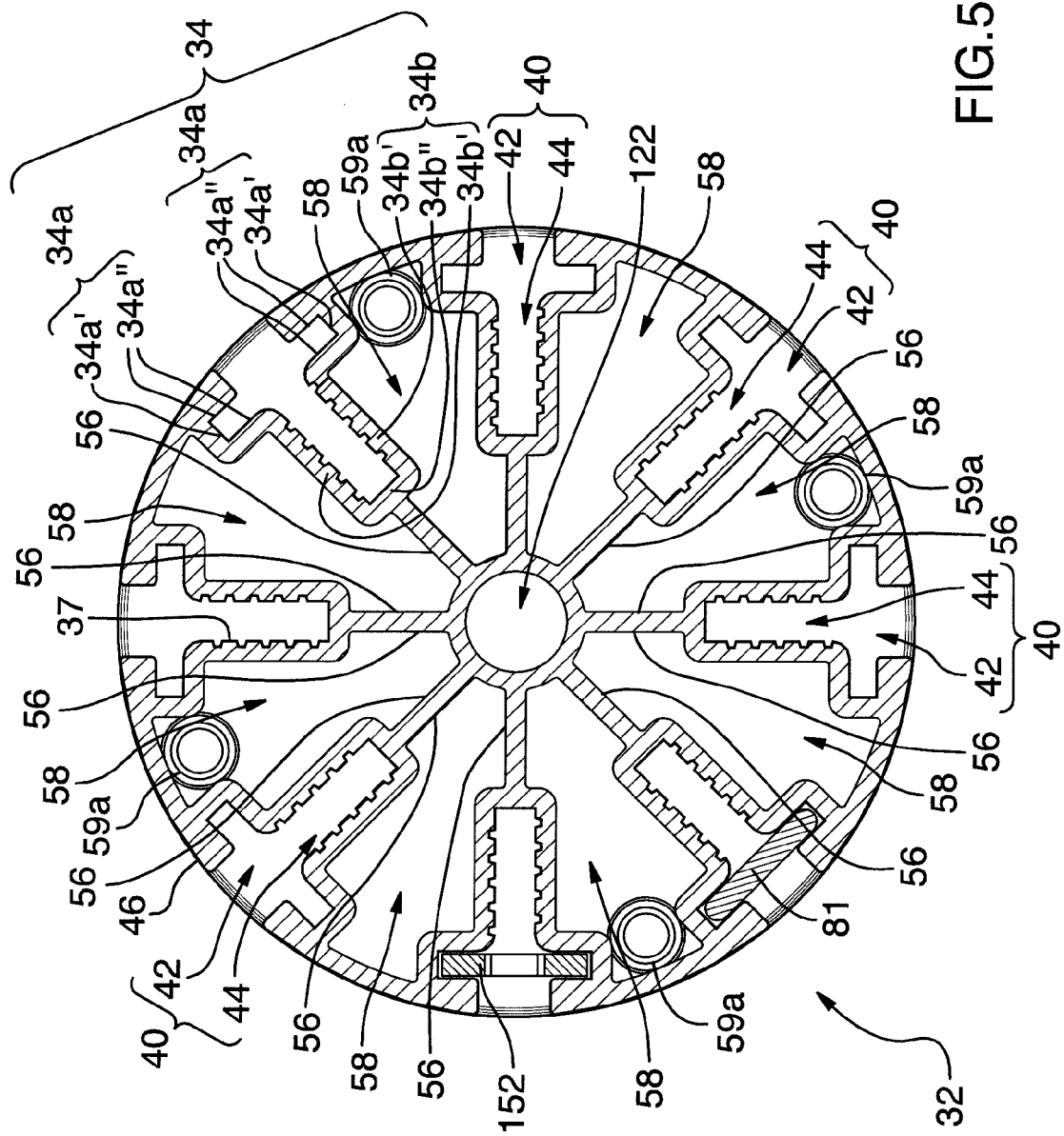

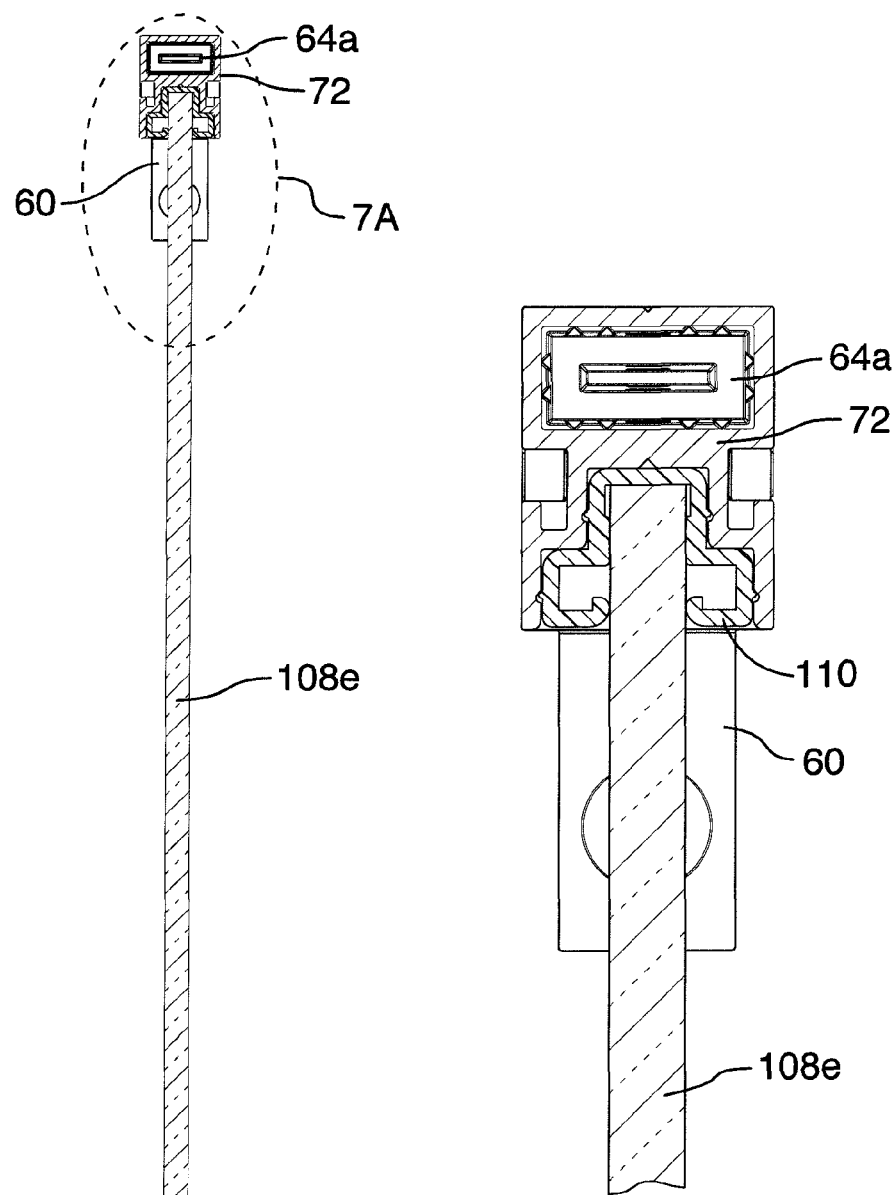
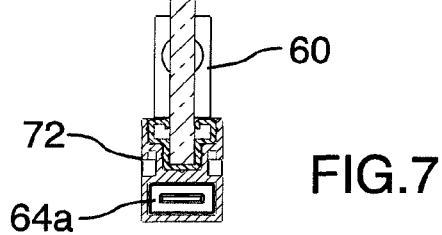
FIG.7
FIG.7A

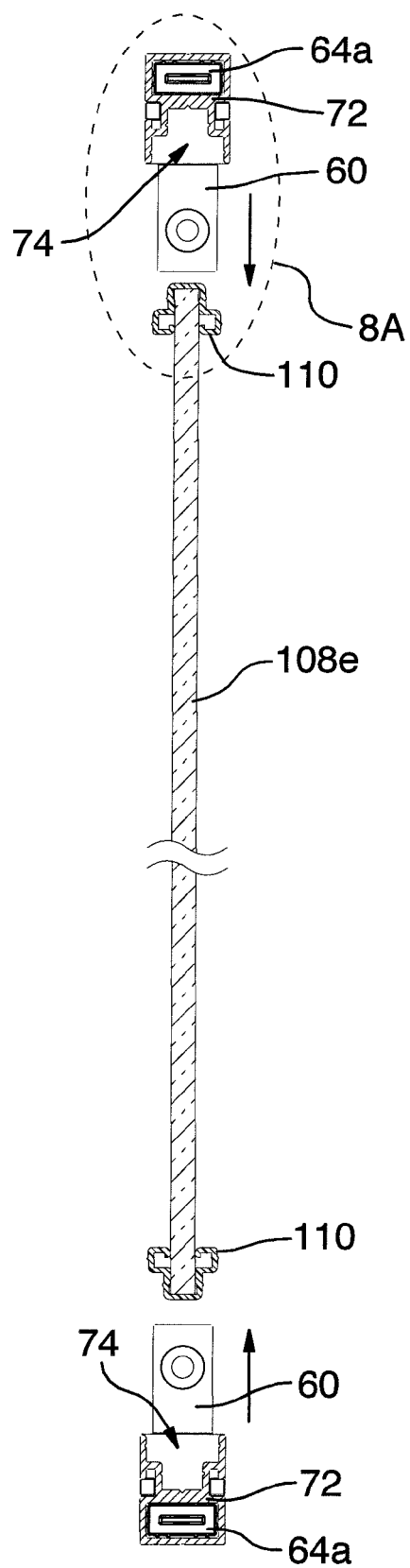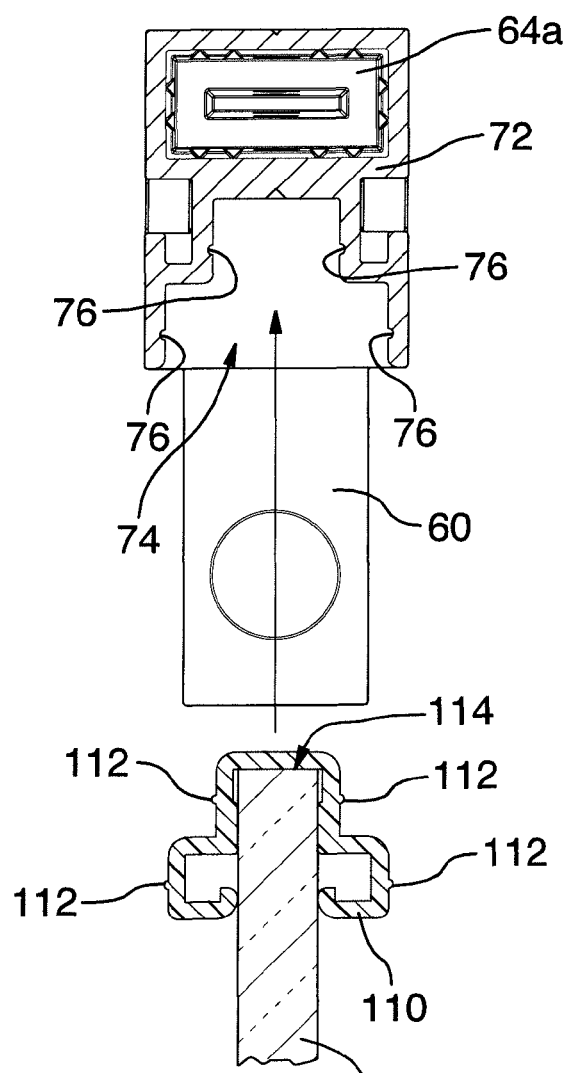
FIG.8
FIG.8A

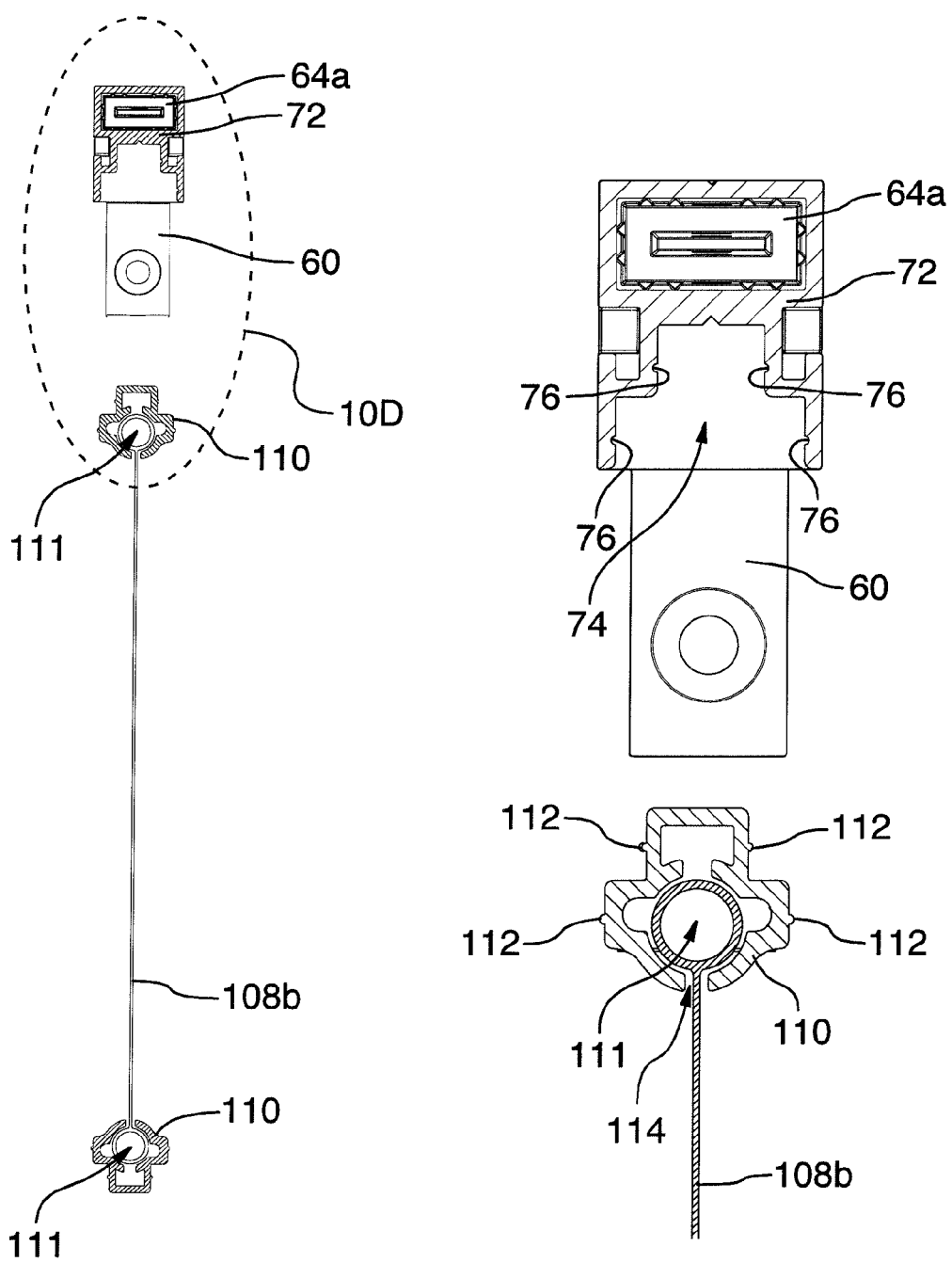
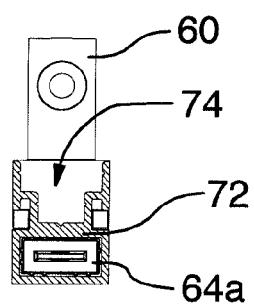
FIG.10D
FIG.10C

MOUNTING SYSTEM FOR WORKSTATIONS

FIELD OF THE INVENTION

The present invention relates generally to the field of office workstations, and more particularly to mounting systems used therewith to support wall panels and other office accessories, such as, for example, work surfaces, shelves, cabinets, bins and drawers.

BACKGROUND OF THE INVENTION

"Workstations" or "cubicles" are commonly used in modern offices to divide larger open spaces into smaller work areas or units. The term "workstation" is hereinafter used interchangeably in this specification and claims to fully encompass both the terms "cubicles" and "workstations". Such workstations may be arranged as stand-alone entities, as is common in, for example, reception areas, or may be grouped together in rows or clusters, as is common in, for example, general office areas. In either case, each such workstation is typically comprised of two or more wall sections of variable height, which do not typically reach the ceiling of the office in which they are situated, interconnected to one another, and quite often of three or more of such wall sections, which together partially enclose a work area for one or more users of the workstation. A work surface is typically mounted on one or more of the wall sections by means of cantilever arms or the like, as may be one or more office furniture accessories such as, for example, shelves, cabinets, bins, drawers and the like.

Workstations of this general type have, for a variety of reasons, including, without limitation, design flexibility, more efficient space utilization, and greater user comfort and efficiency, become very popular over the last several decades, to the extent that they have, to a significant extent, replaced free-standing desks in larger, open-area office environments.

Wall panel systems for constructing workstations can be divided into two major types as follows: those having wall sections comprised of a single monolithic wall panel; and those having wall sections comprised of a plurality of smaller wall panels stacked one above the other in substantially parallel relation to form each wall section. The latter type of stacked wall panel system evolved from the former monolithic panel type, and appears, of late, to be gaining ascendancy thereover. This is likely due to several factors. For example, stacked wall panel systems offer greater design flexibility than monolithic wall panel systems, as different types of wall panels can be used alternately and interchangeably in a single wall section (for example, a single wall section may have a lowermost solid wall panel resistant to deformation or marking by the shoes of a user, above which is positioned one or more thicker, fabric-covered sound-absorptive panels, above which is mounted a relatively thin light transmitting panel etc.). Additionally, stacked wall panel systems have individual components that are generally smaller and lighter; i.e., monolithic wall panels are by their very nature larger and heavier, as compared to stackable wall panels, which makes their handling more difficult and dangerous for moving, storage and assembly of the resulting workstations.

Most stacked wall panel mounting systems for constructing workstations are of the so-called "post and beam" type, which feature wall sections typically having two vertical posts (hereinafter referred to as "columns"), typically of circular cross-section, with a series of parallel support beams extending horizontally therebetween. The wall panels are attached to and supported between adjacent ones of the horizontally extending support beams. The support beams of each wall section are typically releasably attachable to the columns at variable vertical positions during assembly, which allows for the use of wall panels of differing heights. Moreover, adjacent wall sections, may be aligned with one another to form a substantially straight workstation wall portion, or may be arranged in angled relation to one another, around the circumference of common columns, to form a non-linear wall portion. This type of system allows for the selection and use of support beams having a variety of different cross-sectional profiles and constructions to accommodate the use therewith of a wide variety of mating wall panels having different thicknesses, constructions and means of affixation to the support beams.

While post and beam wall panel systems have advantages over monolithic wall panel systems and provide for an extremely wide variety of construction possibilities for workstations, they present their own unique problems and shortcomings.

For example, the wide variety of support beams required to accommodate the coincident variety of wall panel types not only increases the design and production costs of prior art post and beam systems, but also increases the complexity and costs to inventory, stock, ship and assemble these systems. There thus exists in the prior art the need for a post and beam wall panel mounting system that utilizes a single type of support beam for use with wall panels having a wide variety of thicknesses and constructions.

Another problem associated with prior art post and beam wall panel systems is that the mounting means used therein to releasably attach the support beams to the columns are, for the most part, clamp-type mechanisms which grip around the outside perimeter of the respective column at a selected height and angular displacement with the aid of one or more nut and bolt assemblies. Such wall panel mounting systems are not only bulky and aesthetically unpleasing (detracting from what would otherwise typically be a sleek and modern appearance for the assembled workstations, but are cumbersome to install, requiring an unnecessarily large amount of effort and dexterity on the part of installers in order to effect not only their original installation, but also subsequent changes between wall panels, columns, support beams, or any combination thereof. Moreover, the final placement of the support beams on the columns is, because of the lack of any spacing or indexing means associated with the columns, largely a matter of trial and error on the part of the installer.

Some prior art post and beam wall panel systems have developed more aesthetically pleasing means for mounting the support beams to the columns which are less visibly intrusive. However, these systems typically still involve the use of nut and bolt assemblies connecting with the columns, such that they also require a significant degree of manual dexterity and patience on the part of the installer to assemble. The more advanced of these prior art systems have a squared bolt head of a nut and bolt assembly sliding in a vertical channel formed in the column, with the stem of the bolt passing through a mounting lug or bracket associated with each support beam, to thereafter receive a nut of the assembly in screw threaded relation thereon.

Perhaps more importantly, none of the currently available post and beam wall panel systems provide an effective means for variably pre-spacing the mounting brackets for the support beams on the columns before tightening for ready acceptance of wall panels of different heights therebetween. This is especially problematic in relation to flexible wall panels (such as those created from, for example, PVC plastic mesh), which flexible wall panels have no rigidity that might otherwise be relied upon to assist in such pre-spacing.

Prior art post and beam wall panel systems exhibit a further shortcoming related to the problem discussed in the previous paragraph, in that, during installation, the user must manually ensure that each support beam is installed substantially level to horizontal and to the other support beams within a wall section, if the wall panels of that section are to fit evenly therebetween. Moreover, the support beams of adjacent wall sections must all be substantially level to one another, if an even and level appearance to the assembled workstation is to be maintained. To adjust the support beams in this regard, an installer of a prior art post and beam wall panel system will typically be required to manually tighten and loosen the attachment means associated with each support beam several times. That is, once a support beam is preliminary mounted between two columns at an approximate selected height, the installer must thereafter undertake to manually level the support beam through use of a level placed on the support beam, and through re-adjustment of the attachment height of one or both ends of the support beam on a trial-and-error basis. This is particularly important in respect of the bottom-most support beam of a wall section of stacked wall panels. Thus, prior art post and beam wall panel systems fail to provide an integrated means for assisting in achieving a substantially uniform height of engagement of the support columns by both ends of support beams of the system, so as to save time and frustration in leveling said support beams during installation.

Another problem of prior art post and beam wall panel systems is that the columns used therein are typically not extendible in height. They typically come only in half heights (typically used for front wall sections of workstations) and full heights (typically used for rear and side walls of workstations), that cannot be varied. This, of course, limits the number of wall panels that can be stacked between two adjacent columns to the height of the shortest column. More importantly, the ability to re-configure or change prior art workstations to meet new or changing needs is significantly limited, as the height of all of the columns (and the associated wall sections) is fixed and cannot be extended. There thus exists a need for an improved wall panel mounting system that provides a means of quickly and easily extending the height of the columns used therein.

Many prior art post and beam wall panel systems optionally include one or more office furniture accessories designed to be mounted on the columns of same by way of support arms or brackets. Typical examples of such accessories are, without limitation, work surfaces, shelves, cabinets, bins and drawers. Such prior art support arms or brackets suffer from the same general problems described above in relation to the mounting brackets used to mount the support beams—i.e., they are overly bulky and aesthetically displeasing, they have a multiplicity of nut and bolt assemblies that make them cumbersome to install on the columns, they require individual leveling and/or angular orientation about the columns by trial and error, and they fail to have any integral height adjustment, indexing or leveling means associated therewith. Thus, such prior art post and beam wall panel systems fail to provide a quick, easy and cost effective way of installing such accessories on the columns in secure, indexed vertical or angular relation thereto.

Another longstanding problem associated with prior art wall panel systems for workstations is known as "workstation creep", which is the phenomenon wherein, at, during, or after installation, one finds that each workstation in a row of aligned workstations has taken up more space than has been planned and/or allotted for it. For example, an architect or office designer may plan on what is known in the art as a "four foot" workstation actually taking up four feet of space in a particular direction. In reality, the "four foot" designation refers only to the length of the work surface of the workstation, for example a desktop, and does not typically include the width of the wall panels that separate adjacent work surfaces from one another. Such miscalculations can, lead to serious problems during installation of prior art wall panel systems. For example, in an instance of installing ten adjacent workstations each having a wall panel two inches thick between adjacent work surfaces, the workstation creep could account for an under-calculation of as much as twenty-two inches. Such a loss of space is compounded by the difficult nature of installation of prior art systems, in that one may not realize the error until a number of the workstations have already been installed. At that point, reinstallation can be very time consuming, if it is even possible to install a wall panel system having the desired number of workstation in the given amount of floor space. Prior art systems fail to provide a means for dealing with the longstanding problem of work station creep.

The present invention addresses at least one or more of the above described problems associated with the prior art.

SUMMARY OF THE INVENTION in accordance with the present invention there is disclosed a mounting system. The system comprises at least one column having a top end and a bottom end and defining a vertical axis extending therebetween. Each column has internal wall portions which together define at lease one channel within the column, with each channel extending substantially parallel to the vertical axis. Each channel has an outer channel portion opening laterally to an exterior surface of column and an inner channel portion opening from and extending inwardly from the outer channel portion with the outer channel portion being wider than the inner channel portion. The system also comprises one or more mounting brackets each having a first detent member slidably positionable within the channel and engagable with the internal wall portions for fixing each of the mounting brackets against rotation transverse to the vertical axis.

In some cases, the at least one column comprises two columns, with the columns defining a first notional wall plane extending therebetween. The system may further comprise one or more support beams, with the support beams being substantially aligned with the first notional wall plane, and with the support beams being connected at either of their opposite ends to the mounting brackets.

In some cases, at least one of the support beams is vertically spaced at each of the opposite ends thereof from the bottom end of each of the columns by means of a first longitudinal spacer member slidably positionable within the outer channel portion of each of the columns so as to have an upper end portion of the first spacer member in contacting supportable relation with the brackets.

In some cases, the system further comprises one or more attachment means releasably engagable with the mounting brackets and the internal wall portions for securing the mounting brackets to the columns in vertically fixed relation.

In some cases, the internal wall portions comprise a first set of internal wall portions defining each outer channel portion of each channel and a second set of internal wall portions defining each inner channel portion of each channel.

In some cases, the second set of internal wall portions are shaped and dimensioned to define at least one raised ridge therein.

In some cases, the second set of internal wall portions comprises two internal wall portions arranged in substantially opposed parallel relation one to the other to define the width of the inner channel portion.

In some cases, the at least one raised ridge is present on each of the two inner internal wall portions.

In some cases, the at least one raised ridge comprises a plurality of raised ridges and the attachment means comprises one or more screws dimensioned and otherwise adapted to engage the raised ridges in close-fitting relation therewith.

In some cases, the at least one channel comprises two or more channels.

In some cases, two vertically adjacent ones of the support beams are substantially aligned with the first notional wall plane, each being connected as aforesaid to the mounting brackets. The two vertically adjacent ones of said support beams are in substantially parallel spaced relation to one another so as to define a panel space therebetween.

In some cases, the two vertically adjacent ones of the support beams are positioned in the parallel spaced relation to one another by means of a second longitudinal spacer member positioned in the outer channel portion of a selected channel of each of the columns so as to be interposed therebetween, with its opposite ends in substantially contacting relation with the two vertically adjacent ones of the support beams.

In some cases, the at least one column further comprises a third column, with the third column defining, with one of the two columns, a second notional wall plane extending therebetween. One or more of said support beams are substantially aligned with the second notional wall plane and, connected as aforesaid at each of the opposite ends of same to a respective pair of the mounting brackets.

In some cases, each mounting bracket of the respective pair of mounting brackets engages one channel of a pair of the channels, with a respective one of the two columns and the third column defining each of the pair of channels such that the outer channel portions of the pair of channels open substantially towards each other.

In some cases, a plurality of the support beams define, in respective vertically adjacent pairs of the support beams, with each of the vertically adjacent pairs in the substantially spaced relation with one another, a plurality of the panel spaces between the two columns and between the third column and the one of the two columns.

In some cases, the system further comprises one or more extension columns, with each of the extension columns being removably attachable to the top end of a respective one of the two columns and the third column by means of a column connector, with the column connector being interposable between each of the extension columns and each top end.

In some cases, the one or more extension columns comprises at least two extension columns, with adjacent pairs of same each together defining a top notional wall plane.

In some cases, each of the two columns and the third column may further comprise a plurality of interior walls defining one or more interstitial shafts therein, with the interstitial shafts being positioned between the at least one channel in substantially parallel relation to each respective vertical axis, and with the plurality of interior walls further defining a central channel therein substantially aligned with each respective vertical axis, with the central channel being adapted to accept an end screw therein in releasable threaded engagement therewith.

In some cases, the extension columns, the two columns and the third column are all shaped and otherwise dimensioned so as to have a substantially identical transverse cross-section.

In some cases, the mounting brackets are slidably positionable as aforesaid in at least one of the extension columns.

In some cases, two or more of the support beams are substantially aligned with each of the top notional wall planes and each connected as aforesaid to the mounting brackets, with each in the substantially parallel spaced relation to one another, so as to define one or more top panel spaces therebetween.

In some cases, the column connector comprises a plurality of tines shaped and configured to be positionable within the interstitial shafts so as to frictionally engage one or more of the interior walls of the top end of a respective column, thereby to stabilize each column connector atom each top end.

In some cases, the column connector comprises one or more attachment ears defining side openings therein, with each of the attachment ears being located substantially adjacent to a perimeter of the column connector so as to be vertically slidable within said outer channel portion of the channels of a respective top end.

In some cases, each attachment ear is adapted to receive a side screw in throughpassing relation, and the side screw is adapted to engage the raised ridges in releasable threaded engagement therewith.

In some cases, the system further comprises a plurality of panels, with one or more of the panels held in one or more of the panel spaces by the support beams.

In some cases, one or more of the panels is held in one or more of the top panel spaces by the support beams.

In some cases, the panels further comprise one or more flexible mounting strips attached to one or more vertical edges thereof, with each of the flexible mounting strips being adapted for releasable press-fit engagement with a respective one of the support beams.

In some cases, the support beams each define one or more grooves therein for receiving the flexible mounting strips in the aforesaid releasable press-fit engagement.

In some cases, the flexible mounting strips define one or more detents thereon, with the grooves defining one or more complimentary detents thereon, and with the detents being adapted to mate with the complimentary detents.

In some cases, the system further comprises one or more end caps for respectively covering the top end of each of the columns.

In some cases, the system further comprises one or more end caps for respectively covering a top end of each of the extension columns.

In some cases, the system may further comprise a longitudinal rail member slidably positionable within the channel in contacting relation with the internal wall portions to retain the rail member within the channel in substantially parallel relation to the vertical axis.

In some cases, the system may further comprise a first set of one or more indexing means laid out along the length of the longitudinal rail member in substantially regularly spaced relation to one another and in directed relation towards the exterior surface of the column.

In some cases, the system may further comprise at least one support bracket having a main body portion and a second set of one or more indexing means thereon, the second set being complementary to and matable with the first set of indexing means so as to releasably mount the support bracket on the column in indexed mated relation with the rail member.

In some cases, the longitudinal rail member is slidably positionable in laterally retained relation by the internal wall portions within the outer channel portion.

In some cases, the first set of one or more indexing means is comprised of one or more apertures laid out along the length of the longitudinal rail member in substantially regularly spaced relation to one another.

In some cases, the second set of one or more indexing means comprises one or more hook members laterally extending from the main body portion of each the support bracket, the hook members each being dimensioned and otherwise adapted to respectively engage with a selected one of the apertures so as to releasably mount the support bracket on the column in the indexed mated relation with the rail member.

In some cases, the system further comprises a support arm member removably mountable on the main body portion.

In some cases, the support arm member is a cantilever arm member.

In some cases, the cantilever arm member is mounted on the main body portion with the assistance of one or more cap screws passing through the main body portion of the support bracket and into a lower portion of the cantilever arm member.

In some cases, the system may additionally comprise an auxiliary attachment means for attachment of the cantilever arm member to the column by way of releasable engagement with the column.

In some cases, the auxiliary attachment means passes through aligned apertures provided in each of the lower portion and the main body portion before making the releasable engagement with the column.

In some cases, the auxiliary attachment means makes the releasable engagement with the internal wall portions of the column.

In some cases, the at least one raised ridge comprises a plurality of raised ridges and the auxiliary attachment means comprises one or more mounting screws dimensioned and otherwise adapted to engage the raised ridges in close-fitting relation therewith.

In some cases, each support arm member is dimensioned and otherwise adapted to accept in retained supported relation thereon one or more office furniture accessories selected from the group consisting of work surfaces, shelves, cabinets, bins, and drawers.

In some cases, two or more of the support arm members, with two or more of the office furniture accessories being supported by respective ones of the two or more support arm members, so as to be oriented in juxtaposed relation to one another and to define a common wall panel space therebetween, wherein the common wall panel space is occupied by a fabric panel, thereby to minimize the dimension of a space between the two or more of the office furniture accessories.

Various advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the present invention, as to its structure, organization, use and method of operation, together with further objectives and advantages thereof, will be more fully understood from the following drawings in which one or more exemplary embodiments of the invention will now be illustrated and described. It is expressly understood, however, that the drawings and accompanying detailed description are for the purpose of illustration and general description only, and are not intended in any way as a definition of the limits of the invention. In the accompanying drawings:

FIG. 5 a sectional view along sight line 5-5 of FIG. 4;

FIG. 7 is a sectional view along sight line 7-7 of FIG. 4E;

FIG. 7A is an enlarged view of the enclosed area 7A of FIG. 7;

FIG. 8 is a view similar to FIG. 7 shown in a partially exploded configuration;

FIG. 8A is an enlarged view of the enclosed area 8A of FIG. 8;

FIG. 10C is a view similar to FIG. 10A, shown in a partially exploded configuration;

FIG. 10D is an enlarged view of the enclosed area 10D of FIG. 10C;

DETAILED DESCRIPTION OF EXEMPLARY EMBODIMENTS

Figure 1:
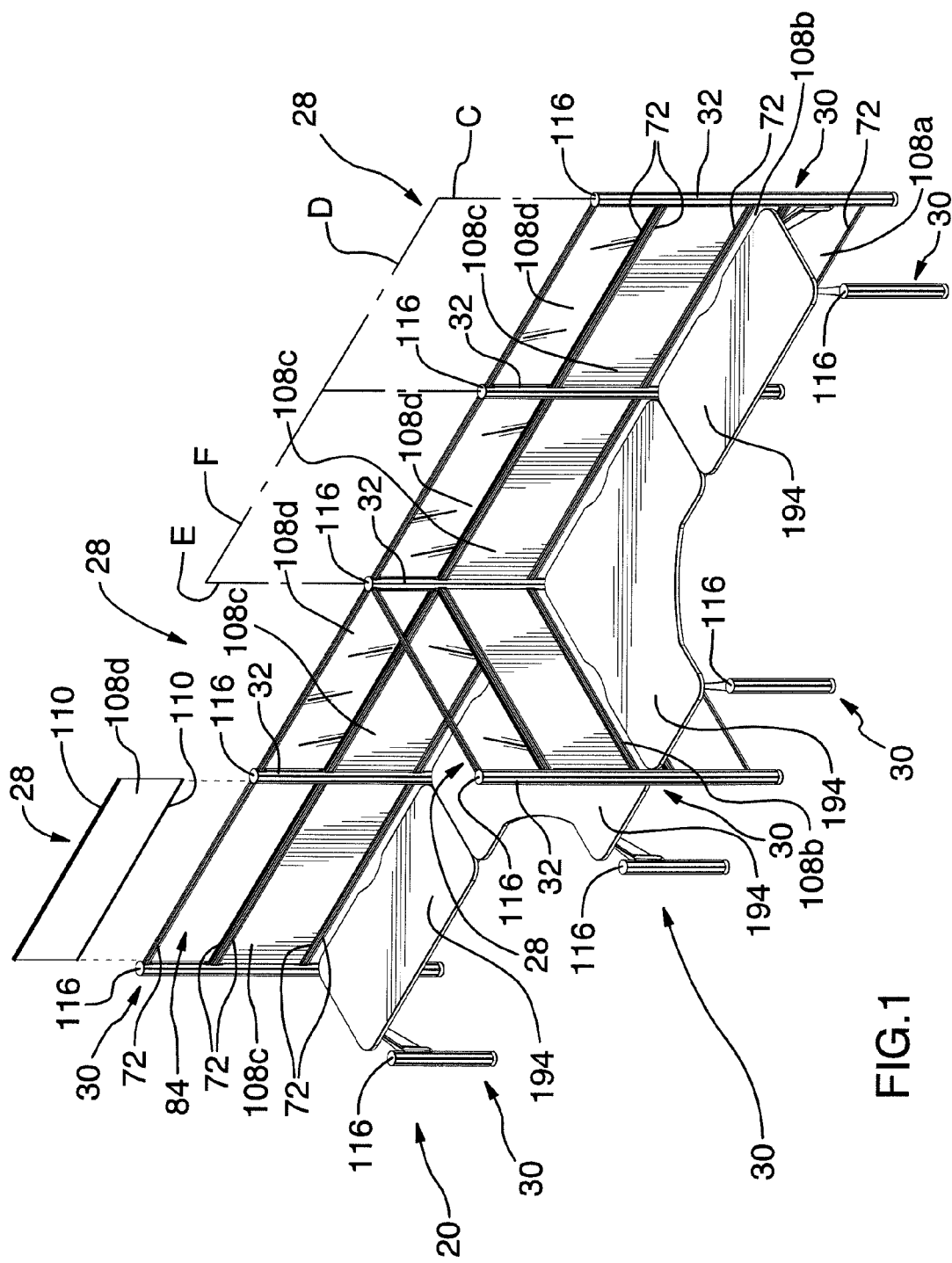
FIG. 1 is a top right perspective view of two aligned workstations incorporating the system of the present invention, with a top left panel moved upwardly so as to better illustrate a panel space.
Figure 4:
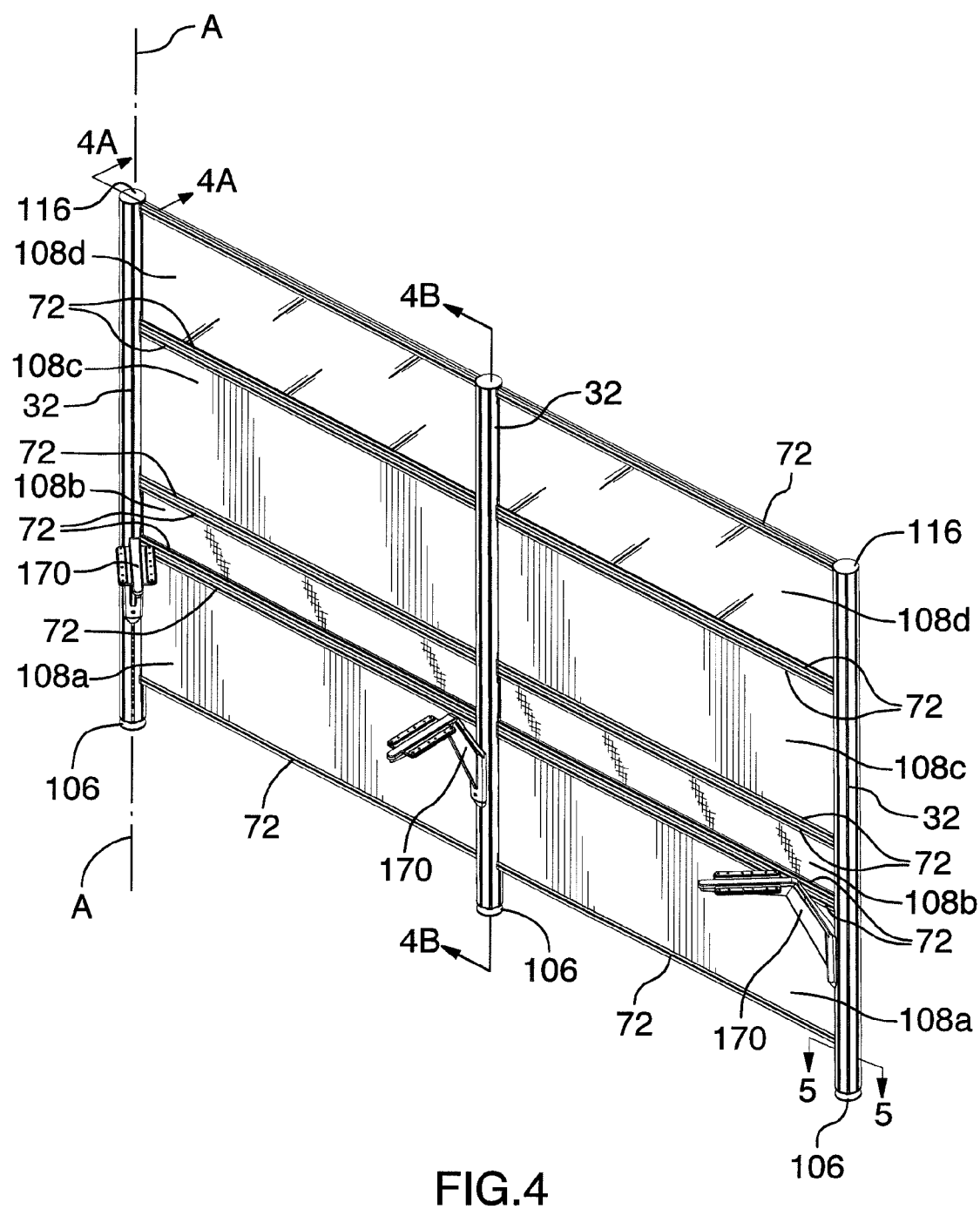
FIG. 4 is a perspective view of a portion of the leftmost workstation of FIG. 1, with the common wall section and office furniture accessories removed therefrom.

Referring generally now to FIGS. 1 and 4, there will be seen two aligned workstations 20, each incorporating multiple instances of a mounting system 30 according to the present invention. The number of instances of such occurrence is coincident with the number of columns 32 used in a particular embodiment. Thus, in FIGS. 1 and 4 there are ten such occurrences. Each mounting system 30 may be used to mount a plurality of panels 108a, 108b, 108c, 108d, and 108e in stacked vertical arrays between two of the columns 32, and may also be used to, for example, hang one or more office furniture accessories 194 from such columns 32. The panels 108a, 108b, 108c, 108d, and 108e are each held in place by horizontally extending support beams 72 attached at either of their ends to the columns 32, so as to collectively define, with the panels, wall sections 28, which sections, along with the office furniture accessories 194, make up each workstation 20. Adjacent workstations 20 are typically, but not essentially, separated by a common wall section 28, as shown in FIG. 1. While a relatively simple configuration of two workstations 20 is shown in the appended Figures and described herein, it will be readily appreciated by those skilled in the art that the mounting system 30 of the present invention may be used with substantially equal utility to form simpler, or more complex, workstation layouts to be used alone, or in larger groupings or clusters of workstations as need requires. In fact, this design flexibility represents yet another advantage of the present invention over the prior art. Nonetheless, for the sake of simplicity of description and illustration, the present detailed description will be limited to use of the present invention with the relatively simple workstation configurations shown in the Figures.

More particularly, there will be seen in FIGS. 1, 3, 3A, 4, 4A, 4B, 4C, 4D, and 4E, a plurality of mounting systems 30 each having a column 32, each said column having a top end 50, and a bottom end 48, and defining a vertical axis extending therebetween as indicated by reference line A-A. As seen in, for example, FIG. 5, each column 32 has internal wall portions 34 which define at least one, and preferably eight channels 40 therein. Each channel 40 has an outer channel portion 42 which opens laterally to an exterior surface 46 of the column 32 in which it is defined, and an inner channel portion 44 opening from and extending inwardly from the outer channel portion 42, as best seen in FIG. 5e The exterior surface 46 of each column 32 preferably, but not essentially, has a substantially circular transverse cross-sectional profile. The outer channel portion 42 preferably spans a greater width than the inner channel portion 44, when considered relative to a radial plane of the column 32 emanating from the vertical axis and bisecting both the outer channel portion 42 and the inner channel portion 44. As best seen FIG. 4B, each channel 40 extends longitudinally along substantially the entire length of the column 32, so as to be substantially parallel to the vertical axis A-A. While each column 32 is shown in the Figures as having eight channels 40, it may alternatively have one channel 40, two channels 40, or more channels 40 defined therein. The number of channels 40 defined in any one of the columns 32 employed in any embodiment of the present invention is a matter of routine design choice for one skilled in the art. This choice may be based upon, for example and without limitation, the cross-sectional profile of a particular column 32, the cross-sectional area of the particular column 32, and the intended design configuration of the particular workstations to be constructed therewith. The precise number of columns 32 to be employed in any given application is a matter of routine design choice, which choice may be based on, for example and without limitation, the number and complexity of the workstation to be deployed, and the dimensions of the office environment in which the system will be deployed. A column 32 having eight channels 40 has particular flexibility in workstation applications, as it allows for wall sections 28 or office furniture accessories 194 emanating from a common column 32 to be radially spaced from one another by as little as 45°.

As seen in FIG. 5, the internal wall portions 34 may preferably comprise a first set 34a of the internal wall portions 34, which first set 34a may preferably comprise radial walls 34a' and circumferentially tangential walls 34a", together defining each outer channel portion 42 of each channel 40. The internal wall portions 34 may preferably further comprise a second set 34b of the internal wall portions 34, which second set 34b may preferably comprise side walls 34b' and an end wall 34b", together defining each inner channel portion 44 of each channel 40. One skilled in the art will recognize that, while each of the channels 40 shown in FIG. 5 is substantially identically shaped and dimensioned to the others shown therein, all of the channels 40 in any particular column 32 need not necessarily be so identically shaped. The side walls 34b' are preferably shaped and dimensioned to define at least one raised ridge 37 thereon, and preferably a plurality of raised ridges 37 as best seen in FIG. 5 (i.e., on two of the side walls 34b', 34b' defining the width of the inner channel portion 44). The second set 34b may preferably comprise two of the internal wall portions 34 (e.g., the side walls 34b', 34b' arranged in substantially opposed parallel relation to one another, and may further compromise additional ones of the internal wall portions 34 (e.g., the end wall 34b"), as shown in FIG. 5. The raised ridges 37 may preferably be in the form of a series of vertically extending striations extending substantially the length of the inner channel portion 44, as will be appreciated from a consideration of, for example, FIGS. 4B, 4C, and 14. As will be appreciated from a consideration of FIG. 5, the inner channel portion 44 of each channel 40 may preferably, but need not necessarily be, of substantially rectangular cross section, with its major axis extending inwardly from the outer channel portion 42 on the radial plane of the column 32 described hereinabove. As will also be appreciated from a consideration of FIG. 5, the outer channel portion 42 may also preferably be of substantially rectangular cross section, preferably, but not necessarily, with its major axis intersecting the major axis of the inner channel portion 44 in substantially perpendicular relation thereto. Furthermore, the column 32 may preferably be composed of a unitary piece of aluminum; however, it may be alternatively composed of any substantially rigid and extrudable material such as, for example, plastic, steel, composite material, and combinations thereof.

Adjacent ones of the columns 32 of the workstation 20 together define notional wall planes therebetween, such as, for example, the first notional wall plane (as represented by intersecting lines C and D in FIG. 1). A second notional wall plane is also defined by a second pair of adjacent ones of the columns 32 shown in FIG. 1, and is, in the embodiment shown, substantially coplanar with the first national wall plane. As such, and for ease of illustration, both the first and second notional planes are represented by the lines C and D in FIG. 1

Figure 4A:
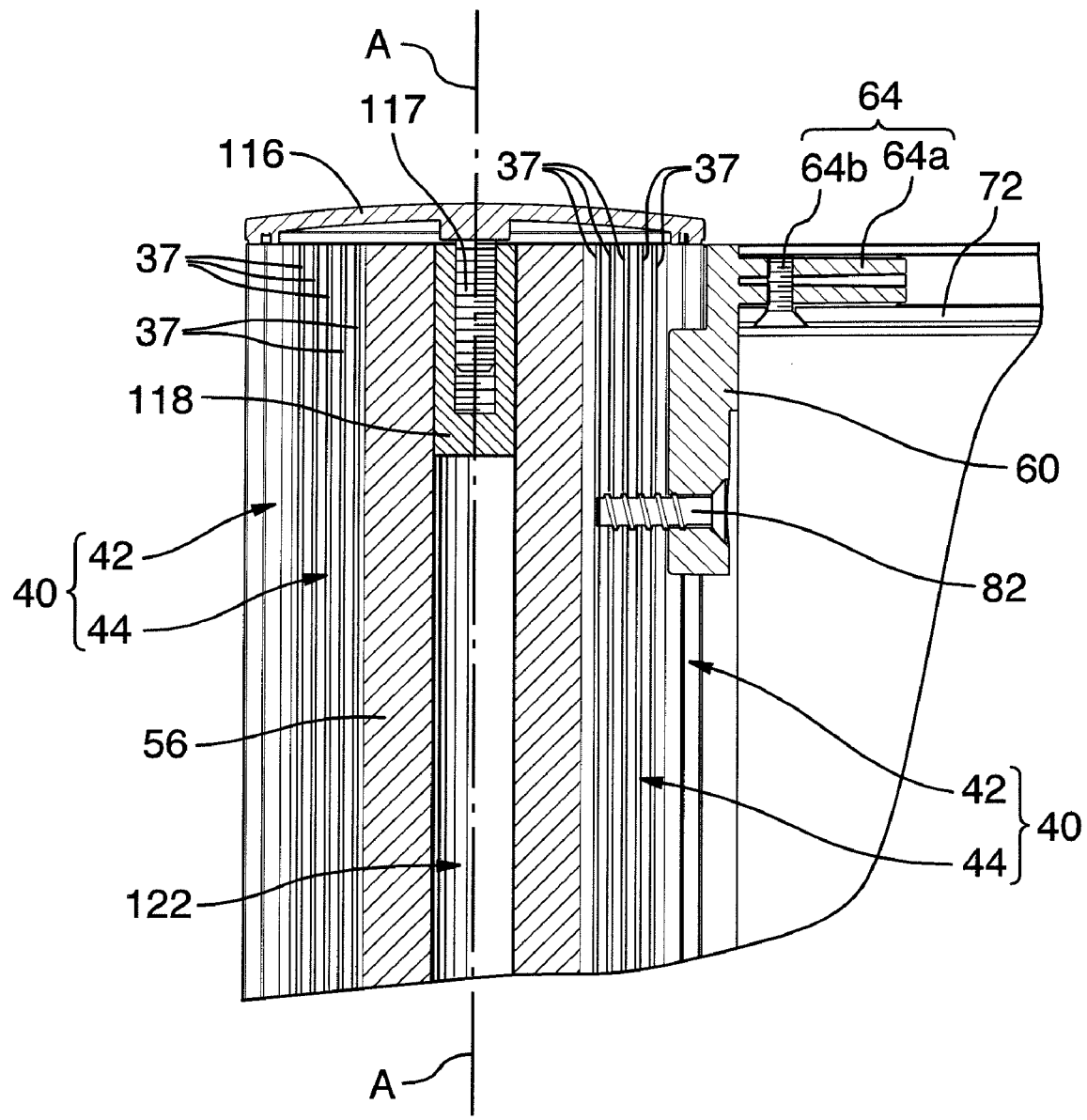
FIG. 4A is a sectional view along sight line 4A-4A of FIG. 4.
Figure 10:
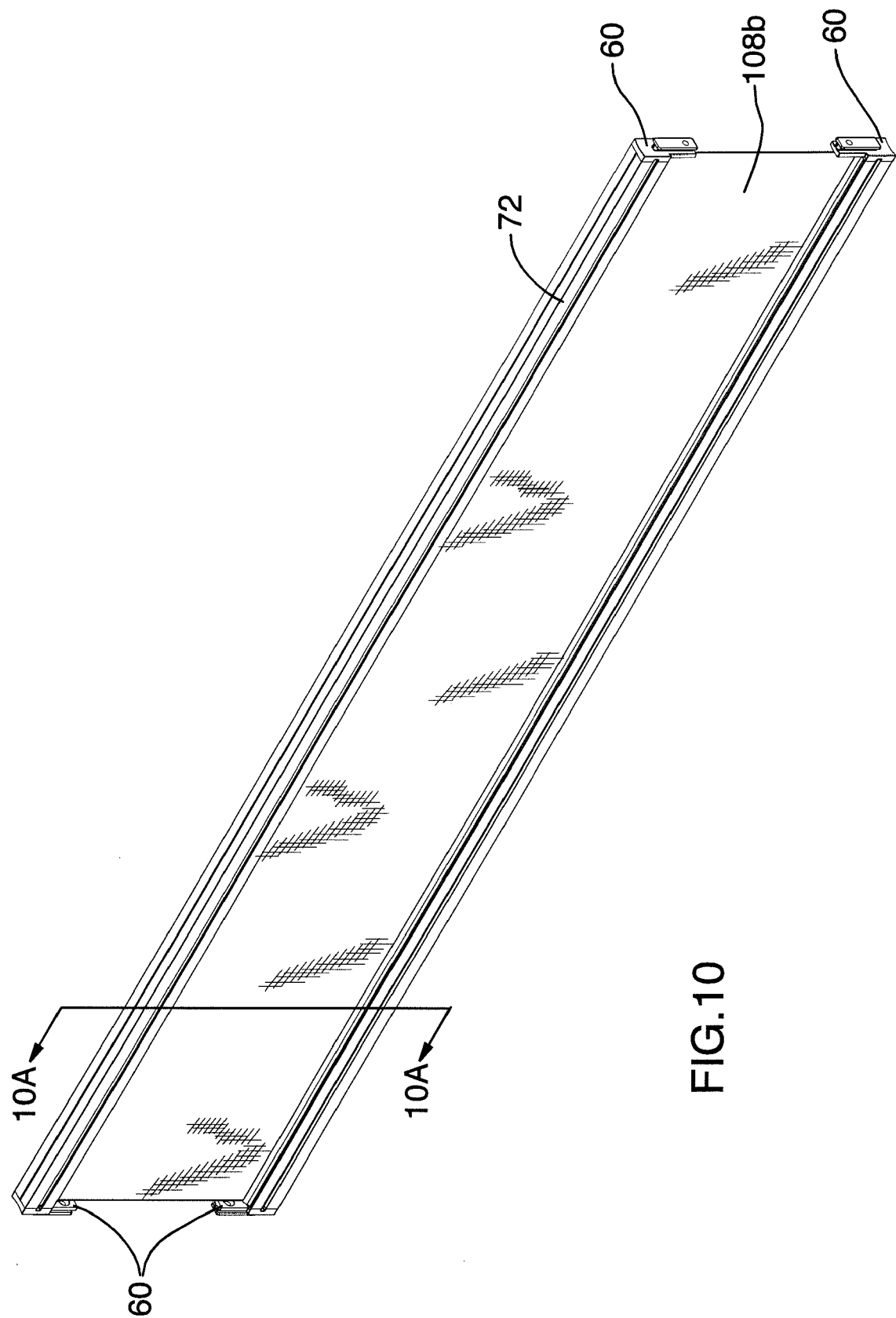
FIG. 10 is a top right perspective view of a panel constructed from a single layer of textile material, shown with flexible mounting strips engaged therewith and with two associated support beams attached thereto.
Figures 10A, 10B:
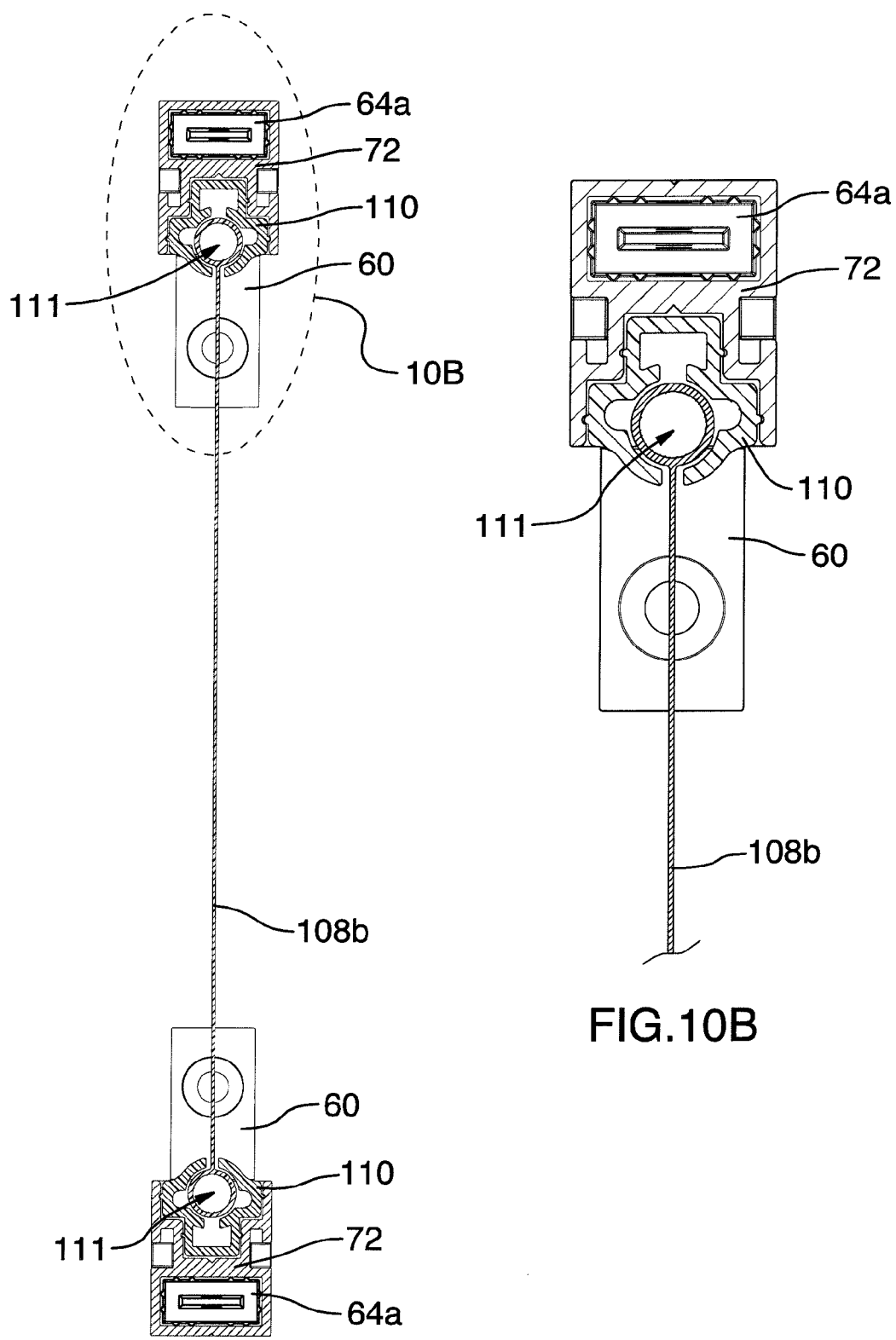
FIG. 10A is a sectional view along sight line 10A-10A of FIG. 10.
FIG. 10B is an enlarged view of the enclosed area 10A of FIG. 10.
Figure 10E:
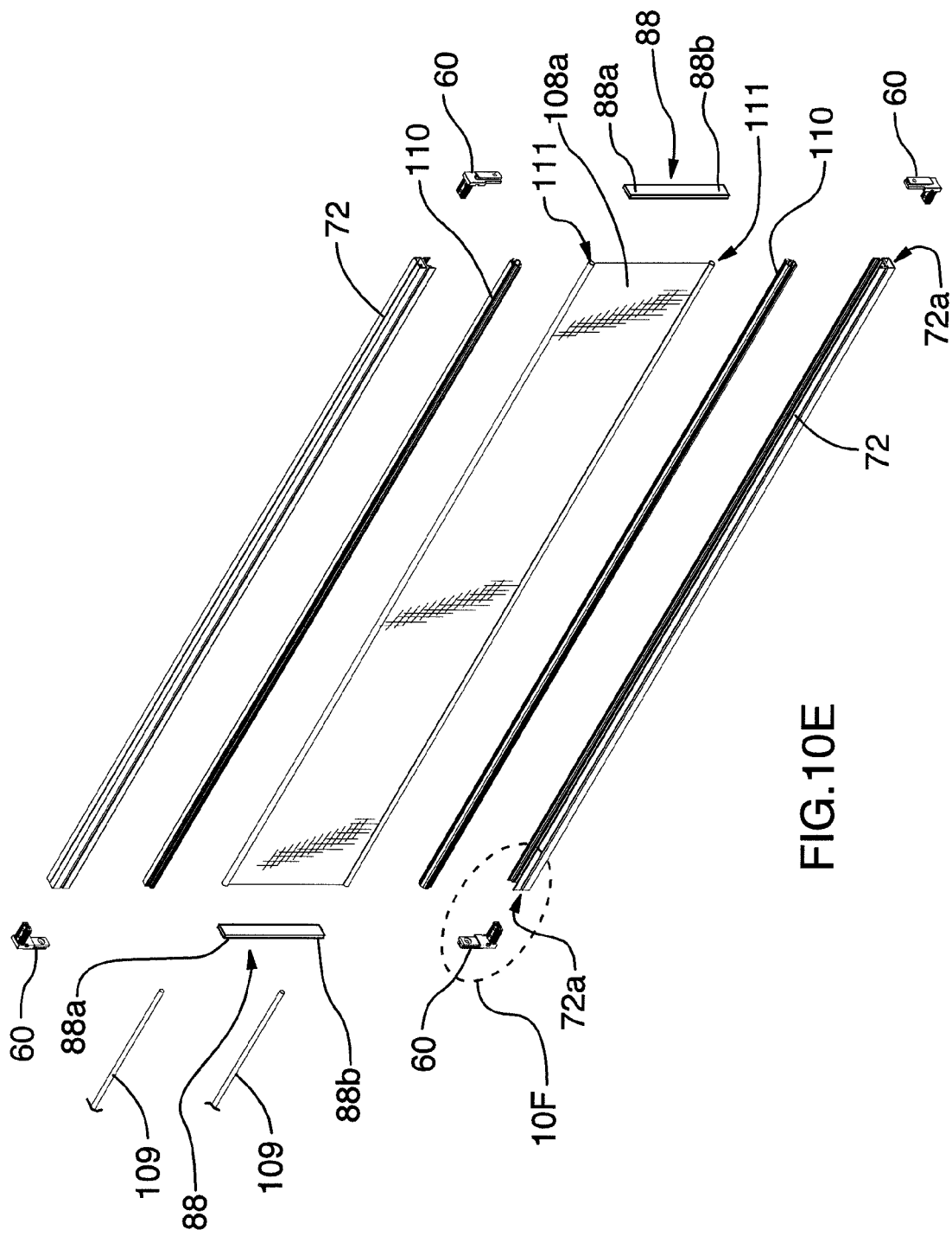
FIG. 10E is a view similar to FIG. 10, shown in an exploded configuration, with two second longitudinal spacer members additionally shown.
Figure 10F:
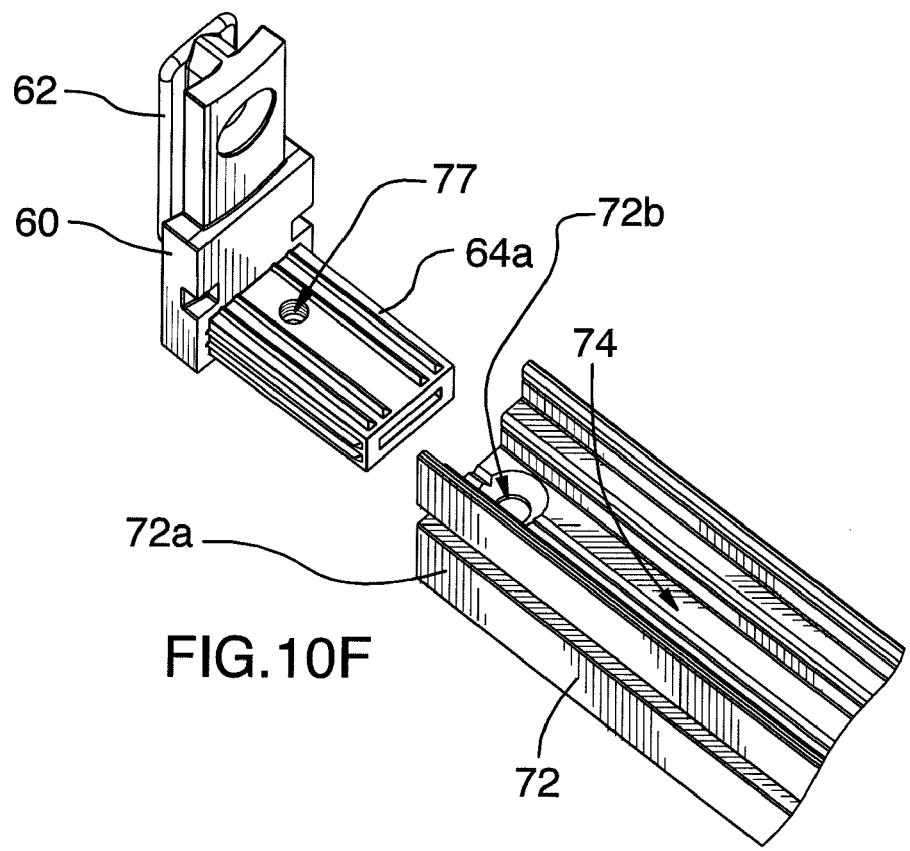
FIG. 10F is an enlarged view of the enclosed area 10F of FIG. 10E.
Figure 10G:
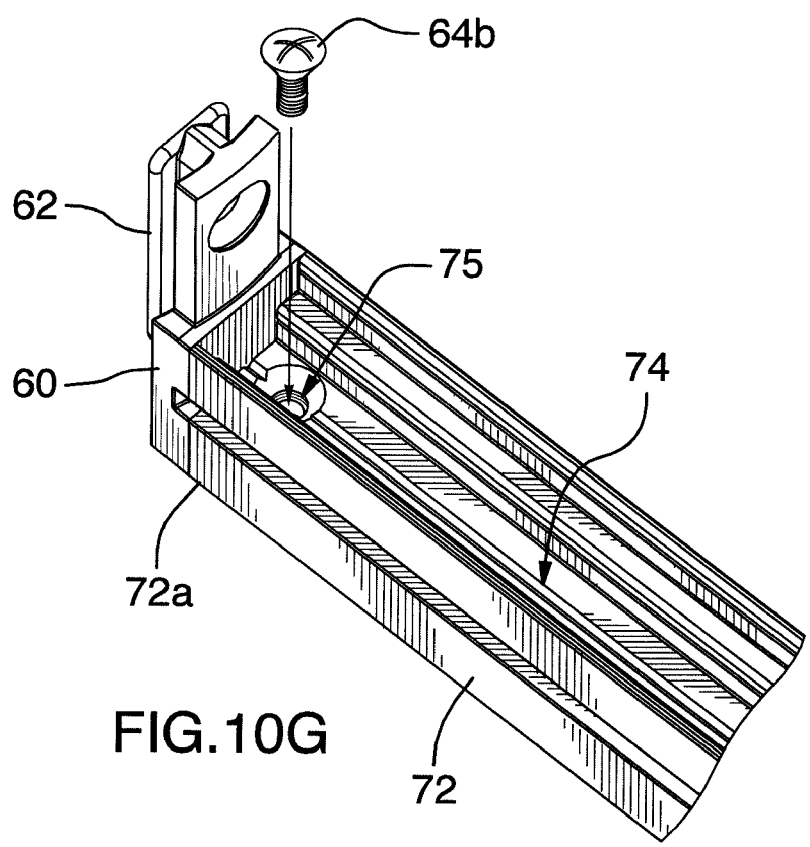
FIG. 10G is a view similar to FIG. 10F, showing the components of FIG. 10F engaged with one another.
Figure 15:
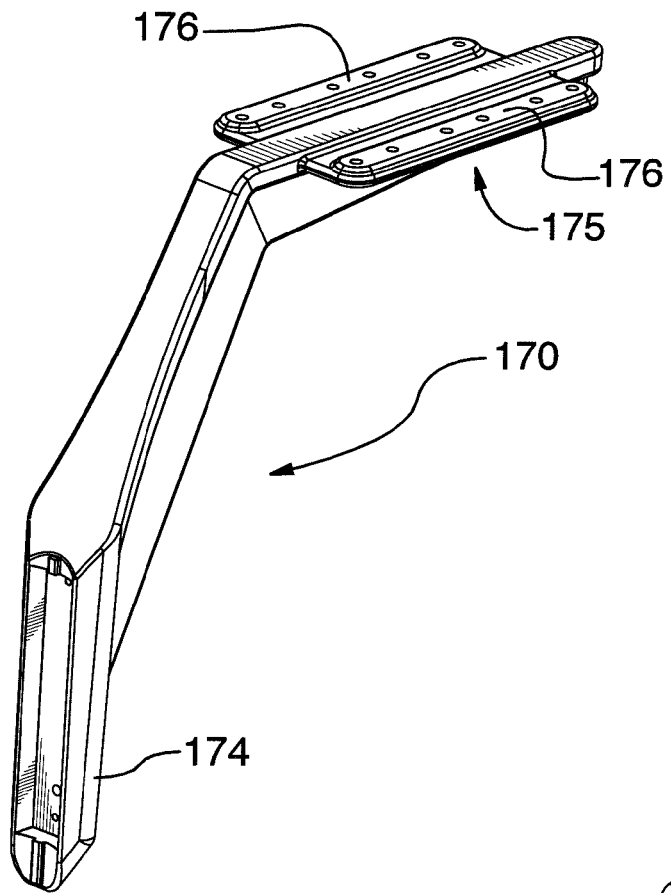
FIG. 15 is a bottom left perspective view, front the rear, of a cantilever arm member.

As briefly aforementioned, the system 30 may further comprise the support beams 72, best seen in FIGS. 10E, 10F, and 10G, which are each substantially aligned with one or more of the notional wall planes such as, for example, the first notional wall plane, as will be appreciated from a consideration of FIG. 1. Each of the support beams 72 is also connected, at each of its opposite ends 72a, to a mounting bracket 60, as best seen in FIGS. 10F and 10G. Generally speaking, and as seen in FIGS. 4A, 4F, and 10G, each mounting bracket 60 has a first detent member 62 that is slidably positionable within the channel 40. Each first detent member 62 is also engagable with the internal wall portions 34 for fixing each of the mounting brackets 60 to the column 32 so as to be restrained against rotation transverse to the vertical axis A-A. As will be appreciated from a closer consideration of FIGS. 4A and 4F, the first detent member 62 may preferably, but need not necessarily, be slidably positionable within the outer channel portion 42 of the respective channel 40, so as to be engaged with the first set 34a of the internal wall portions 34. When the mounting brackets 60 are engaged as shown in FIGS. 4A, 4F and 15, the radial walls 34a' restrain each first detent member 62 against movement parallel to the major axis of the outer channel portion 42. Similarly, the circumferentially tangential walls 34a'' restrain each first detent member 62 against movement parallel to the minor axis of the outer channel portion 42. While the shapes of the outer channel portions 44 and the first detent members are both routine design choices for one skilled in the art, their respective shapes should, in any event, each compliment the other so as to thereby facilitate restraint of horizontal movement of the first detent member 62.

The support beams 72 may each be releasably connected at their opposite ends 72a of same to a respective one of the mounting brackets 60 by means of a fixation means 64 associated with each of the mounting brackets 60, as will be appreciated from a consideration of FIGS. 10F and 103. The fixation means 64 may comprise a flange 64a on each of the mounting brackets 60, with the flange 64a being slidably engagable with a respective end 72a of each of the support beams 72. The fixation means 64 may preferably further comprise one or more machine screws 64b passing through a suitably sized aperture 75 formed in the support beam 72 to engage an alignable threaded socket 77 formed in the flange 64a, as seen in FIG. 4A, so as to hold the flange 64a in frictionally retained relation the respective support beam 72.

As seen in FIG. 1, pairs of vertically adjacent ones of the support beams 72, may each be connected as aforesaid to the mounting brackets 60, in substantially aligned relation to one of the planes defined by the columns 32, and in substantially parallel spaced relation to one another so as to define a panel space 84 between each pair. One skilled in the art will recognize that, while only one panel space 84 is shown unoccupied in FIG. 1, a panel 108a, 108b, 108c, 108d would typically occupy each other panel space 84 defined by the columns 32 of the workstations 20, 20. Each panel space 84 may be of different height than the others. Selection of panel space 84 dimensions is a matter of routine design choice for one skilled in the art, which choice may be made based upon, for example and without limitation, the size and vertical location of the panels 108 to be used in the particular application. As seen in FIG. 1, every adjacent pair of support beams 72 does not necessarily define a panel space 84 therebetween, merely those in substantially spaced relation (and not those laterally adjacent to one another). One skilled in the art will recognize that one or more of the panels spaces 84 contained within a wall section 28 will typically be arranged so as to be substantially parallel in their orientation to the other panels 108 within that respective wall section 28.

A workstation 20 incorporating the system 30 of the present invention will typically further comprise, as seen in FIGS. 1 and 4, a plurality of panels 108 held, one above the other in one or more of the panel spaces 84 by the support beams 72. The panels 108 may, but need not necessarily, comprise panels selected from a group of panels constructed: from a substantially rigid core material not covered on its outer faces by the textile materials, as designated by the reference numeral 108a in the Figures; with a substantially rigid core material covered on its outer faces by a textile material, as designated by the reference numeral 108c in the Figures; from a single layer or a textile material, as designated by the reference numeral 108b in the Figures; from a substantially translucent material, as designated by the reference numeral 108d in the Figures; and, from a substantially transparent material, as designated by the reference numeral 108e in the Figures.

The core material of the uncovered rigid panels 108a may preferably comprise a material such as, for example, wood or particle board, as is well known in the art. Such panels 108a may preferably, but need not necessarily, include a scuff and/or scratch-resistant outer layer on each side of the core, which outer layer may be comprised of, for example, one or more plastic materials available under the trademarks Melamine®, Formica®, or the like. Such panels 108a may preferably at least comprise the bottom-most panel of each wall section 28 (as shown in FIGS. 1 and 4) as they are typically subjected to marking and/or deformation resulting from, for examples contact with the shoes of users and/or passers-by. The panels 10a may preferably be of a thickness substantially in the range of about ⅜ inches to about ⅝ inches (with the core material being of a thickness of about ¼ inches to about ½ inches).

The single layer of textile panels 108b may preferably be constructed from polyvinyl chloride mesh material, with the mesh preferably being of an open woven style, which may allow air and/or diffuse light to pass therethrough. Such mesh material may be such as that currently used in, for example and without limitation, commercial grade sunscreen window blinds. Such mesh material is commonly of a thickness substantially in the range of about 1/64 Inches to about ⅛ inches. The single layer of textile panels 108b may preferably be employed in the wall sections 28 at the level of the work surfaces 194 (such as those shown in FIGS. 1, 2, 3, and 3A) so as to minimize the amount of space separating adjacent ones of same, as will be apparent from a consideration of FIG. 3A. This manner of utilizing same severely curtails the amount of workstation creep that would otherwise follow from the use of thicker panels.

Figure 11:
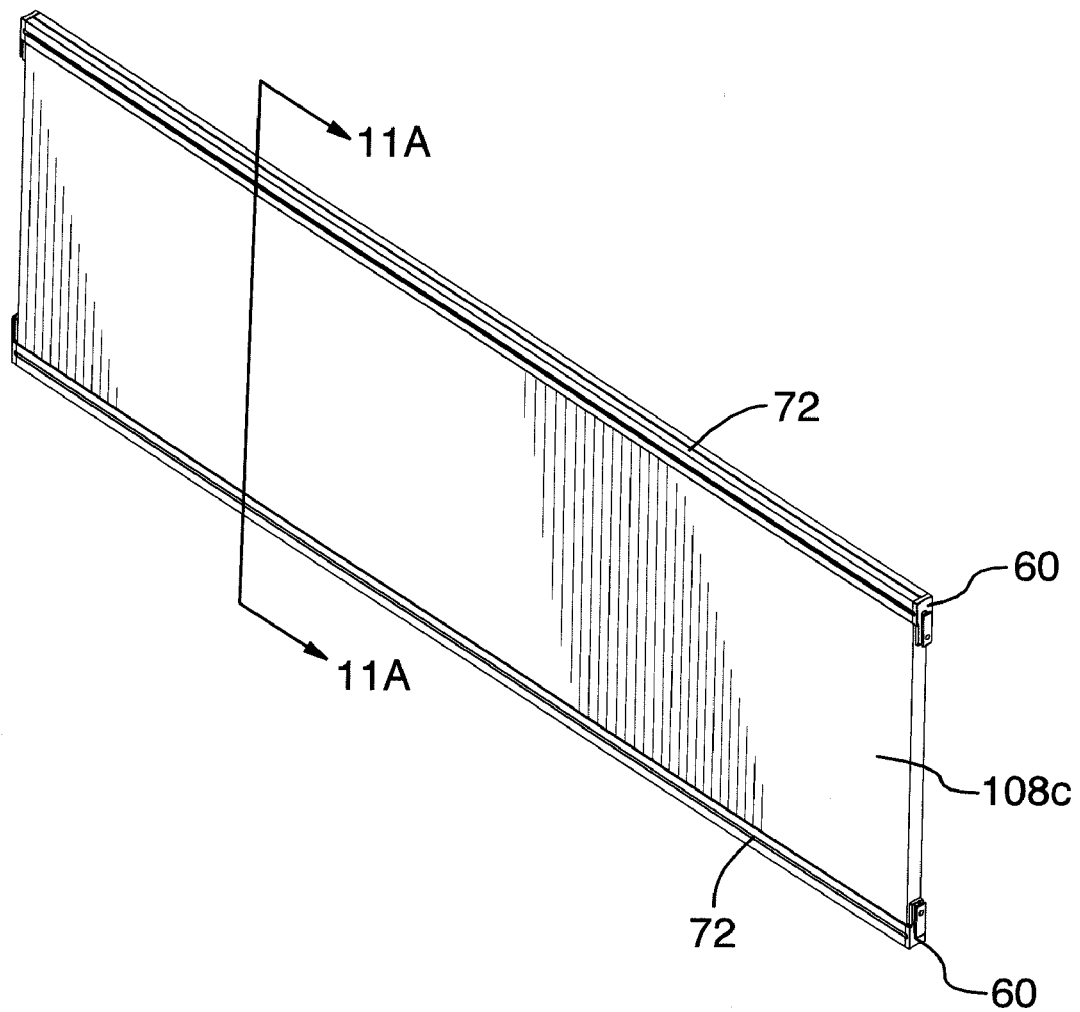
FIG. 11 is a top right perspective view of a panel section constructed from a substantially rigid core material covered on its outer faces by a textile material, shown engaged with two support beams.
Figure 11A:
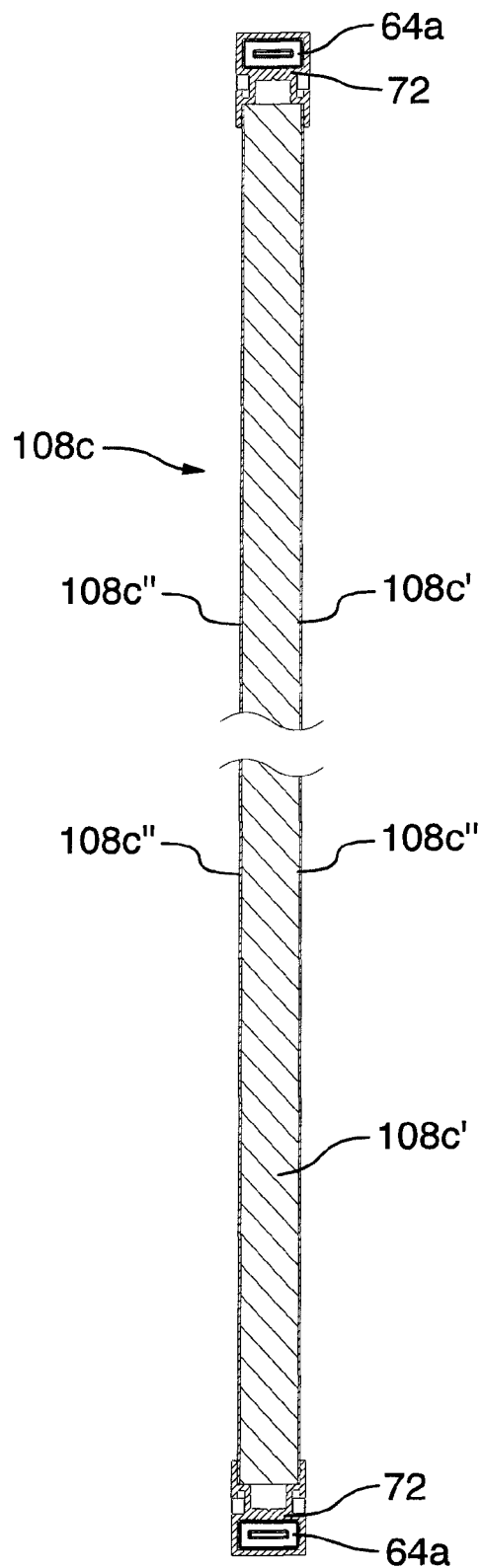
FIG. 11A is a sectional view along sight line 11A-11A of FIG. 11.
Figure 11B:
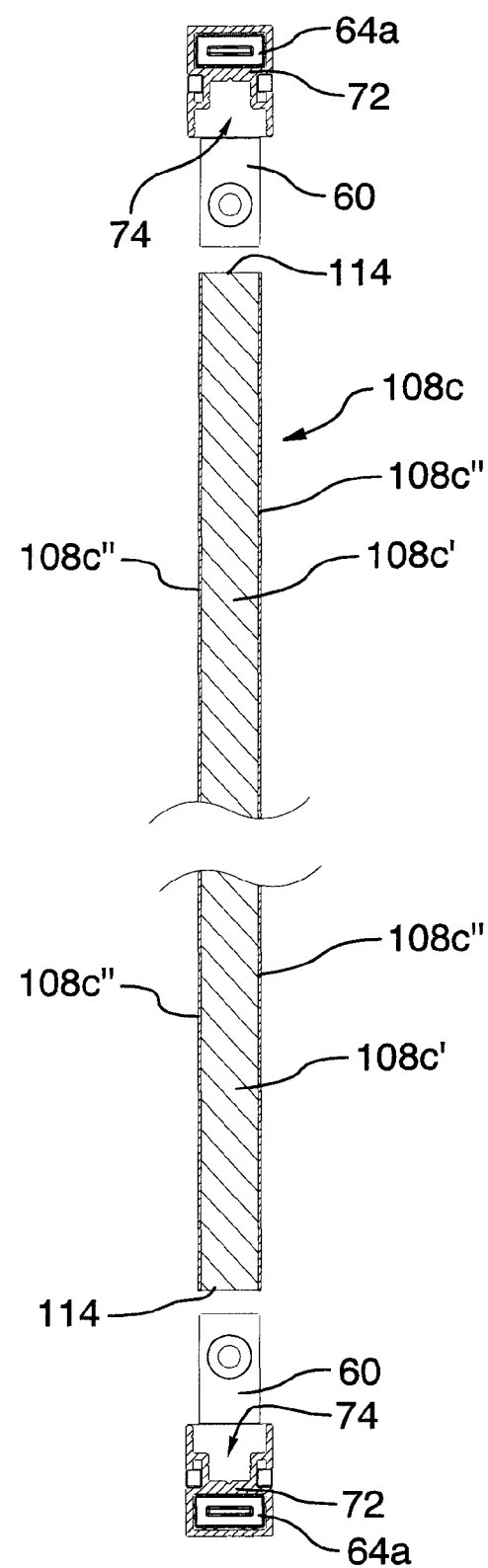
FIG. 11B is a view similar to FIG. 11A shown with the support beams disengaged from the panel.

The panels 108c may preferably be comprised of a core 108c', and an outer textile layer 108c" covering each of the faces of each such panel 108c, as best seen in FIGS. 11A and 11B. The core 108c' may preferably be comprised of a material having sound absorptive properties, and which material may preferably be somewhat resilient when compressed. Such a material may comprise, for example, paperboard or semi-rigid fiberglass insulation panels and the like. Given the above described sound absorptive properties, the panels 108c may preferably be employed, for example, above the height of the work surfaces 194 shown in FIG. 1, so as to limit noise (e.g., that created by keyboards and telephones) from traveling from one workstation 20 to another. Each textile layer 108c" itself may be comprised of one or more fabric layers. The core 108c' and textile layer 108c" may preferably have a cumulative thickness substantially within the range of about ⅜ inches to about ¾ inches, with the core 108c' preferably having a thickness substantially within the range of about ¼ inches to about ½ inches.

Materials which make up the substantially translucent panels 108d may include, for example, plastic materials marketed under the trade marks Lucite® and/or Lexan®. Such panels 108d may additionally be substantially rigid, and may be of a thickness substantially within the range of about ¼ inches to about ¾ inches. As the substantially translucent panels will allow light to travel therethrough, this type of panel may preferably be employed at a level well above the height of a work surface 194 (such as those shown in FIG. 1), so as to allow more ambient light to reach a greater portion of the office environment.

Materials which make up the substantially transparent panels 108e may include, for example, plastic materials marketed under the trade marks Lucite® and/or Lexan®. Such panels 108b may additionally be substantially rigid and may be of a thickness substantially within the range of about ¼ inches to about ¾ inches. The substantially transparent panels 108e may preferably be employed at such a height in the wall sections 28 so as to allow a user to see therethrough on a substantially horizontal sightline when in a standing position.

The sizes and arrangements of particular panels 108a, 108b, 108c, 108d, 108e to be used in any application of the present invention are matters of routine design choice for one skilled in the art, which choices may be based upon, for example and without limitation, the properties of each of the panels discussed hereinabove, the proposed use and/or size of the particular workstation(s), and/or their location within an office environment. For ease of illustration, less than the full height of the respective panels 108 (i.e., 108c, 108d, and 108d) shown in each of FIGS. 8, 11A and 11B is shown in each of same. Each of the panels 108 may optionally have one or more design and/or promotional indicia (not shown) marked thereon, such as, for example, corporate logos and the like.

Figure 9:
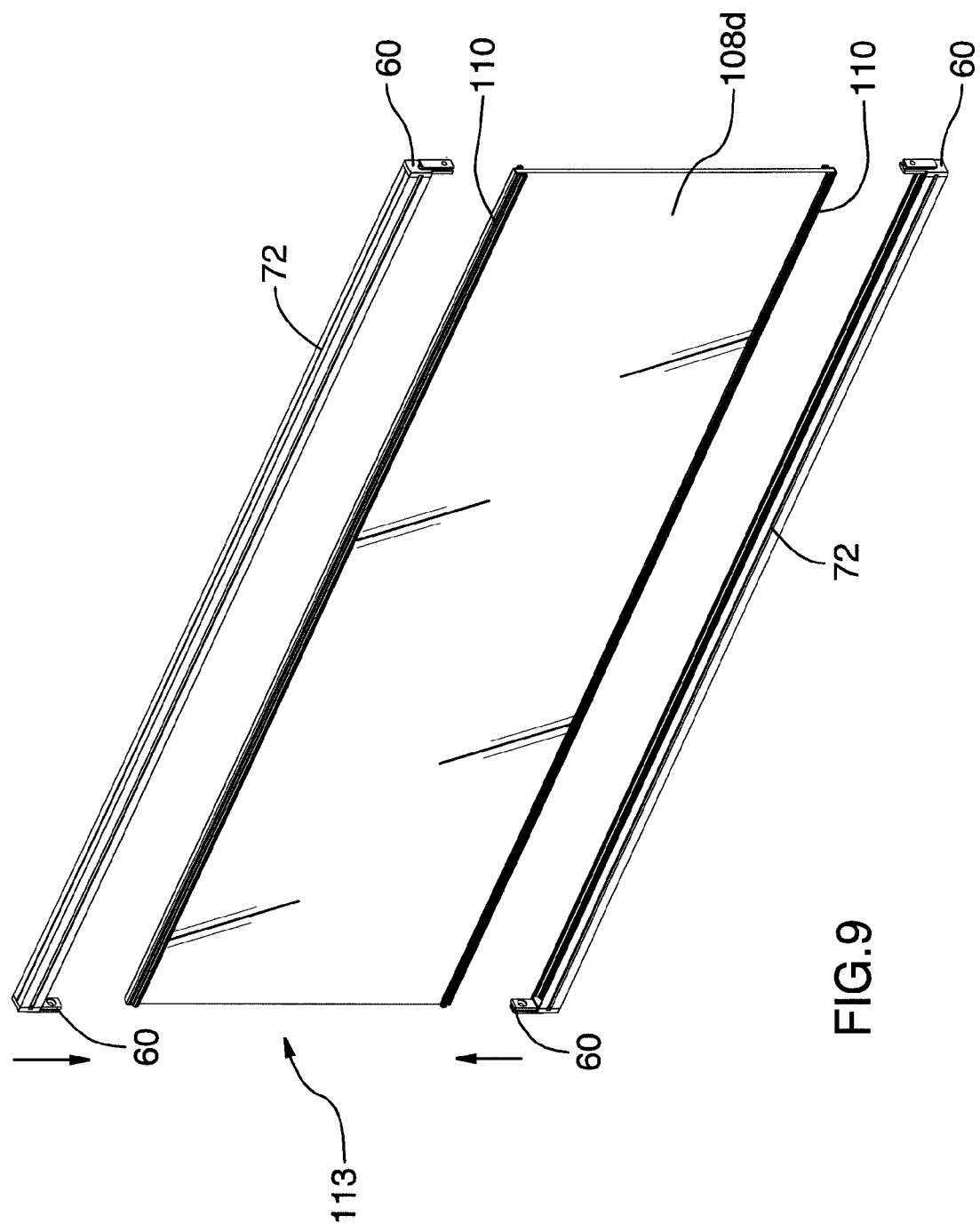
FIG. 9 is a top right partially exploded perspective view of a panel constructed from a substantially transparent material, shown with flexible mounting strips engaged therewith and adjacent to two associated support beams with mounting brackets thereon.

The panels 108 may have one or more flexible mounting strips 110 constructed from, for example, resilient vinyl or rubber materials, attached to one or more vertical edges 114 thereof, so as to comprise one or more panel assemblies 113, as best seen in FIG. 9. The attachment of the flexible mounting strips 110 to the vertical edges 114 to from such assemblies may be by way, for example, frictional gripping thereof and/or one or more adhesives (e.g. tape, glue and the like). As best seen in FIG. 10E, one or more dowel rods 109 may optionally be added to the assemblies 113 which are slidably insertable within one or more cylindrical sleeves 111 defined adjacent the edges 114 of, for example, the single layer of textile panels 108b themselves, so as to facilitate engagement with the flexible mounting strips 110. One skilled in the art will recognize that the single layer textile panel 108b may alternatively be configured at the edges 114 thereof so as to be adapted to engage the flexible mounting strips 110 without the use of the dowel rods 109.

Figure 11C:
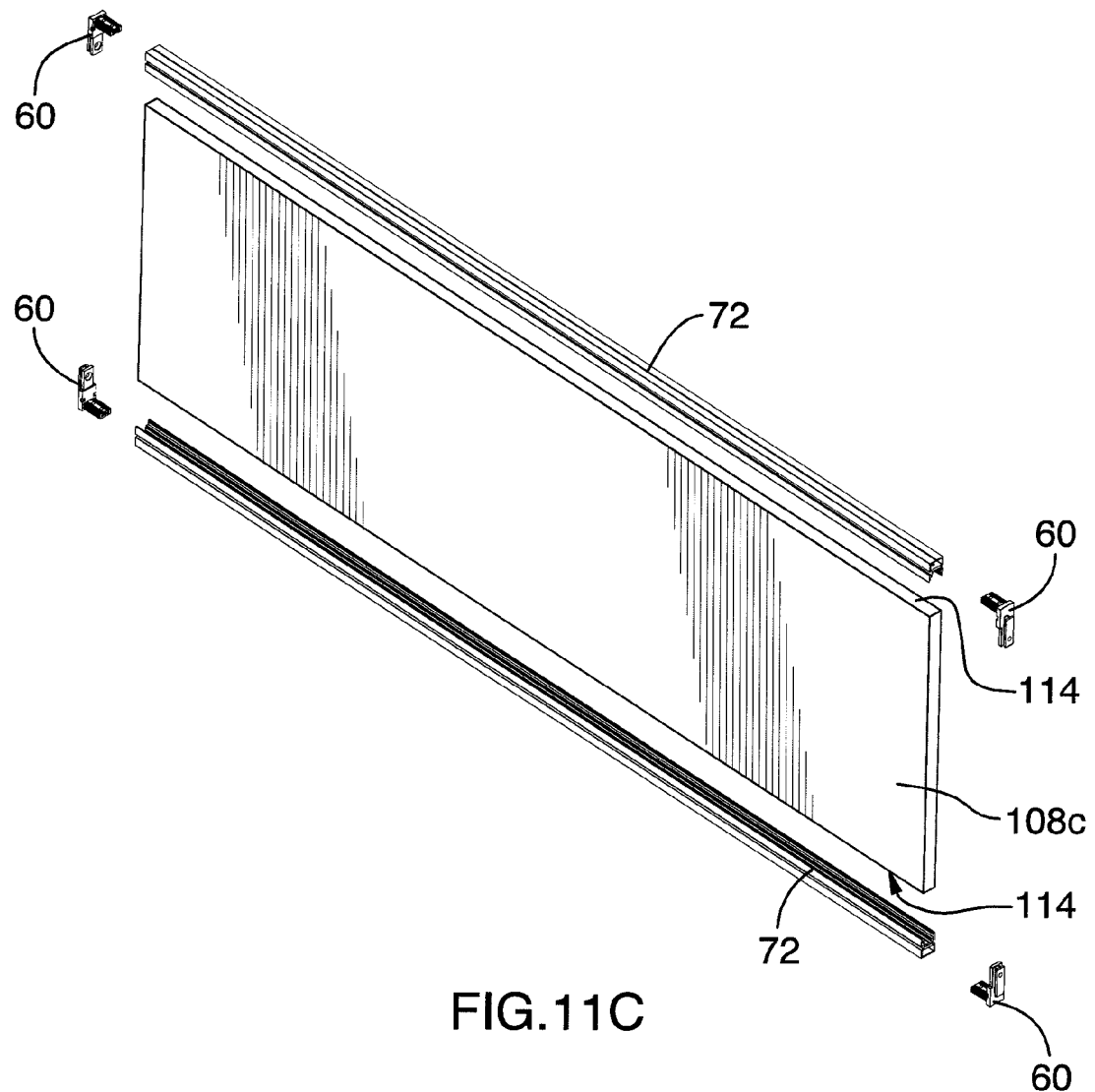
FIG. 11C is a view similar to FIG. 11, shown in an exploded configuration.
Figure 12:
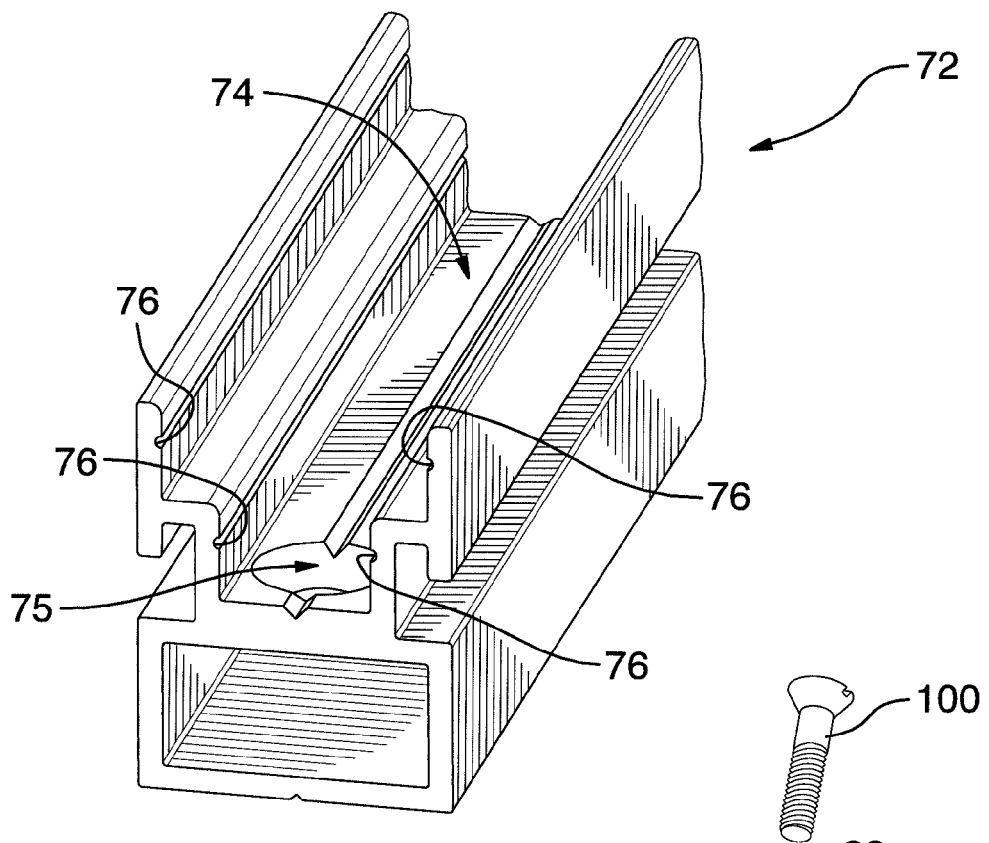
FIG. 12 is a top left perspective view of an end portion of any one of the support beams shown in the other Figures.

As best seen in FIG. 9, each flexible mounting strip 110 may be of substantially the same length as the one of the panels 108 to whose vertical edges 114 it is to be attached. One skilled in the art will further recognize that any of the panels 108 which are comprised of substantially rigid materials (i.e. those designated in the Figures by reference numerals 108a, 108c, 108d, and 108e) may, in some embodiments of the present invention, be provided without the flexible mounting strips 110 attached thereto. For example the panels 108c shown in FIGS. 11A, 11B, and 11C are shown without the flexible mounting strips 110 thereon.

Where used, each of the flexible mounting strips 110 may preferably be adapted for releasable press fit engagement with a respective one of the support beams 72, as will be appreciated from a consideration of FIGS. 8, 8A and 9. As best seen in FIGS. 8A, 10D and 12, the support beams 72 may each define one or more longitudinally extending grooves 74 therein for receiving the flexible mounting strips 110 in releasable press fit engagement as aforesaid. The flexible mounting strips 110 may preferably define one or more male detents 112 thereon as best seen in FIGS. 8A and 11A, with the grooves 74 defining one or more female complementary detents 76 thereon, as best seen in FIGS. 8A, 10D and 12. The male detents 112 are adapted to mate with the complimentary female detents, as best seen in FIGS. 7A and 10B. In instances such as that shown in FIGS. 11A and 11B, the panel 108c may be engaged directly with the grooves 74 defined in the support beams 72 (i.e., without the use of the flexible mounting strips 110). This is likely to be the case where the core 108c' of the panels 108c is somewhat rigid, but has some resiliency, such as, for example, where said core 108c' is constructed from a compressible, semi-rigid paperboard, or fiberglass sound absorptive insulation, material. Alternatively, the outer fabric layers 108c" covering the two outer faces of the panel 108c may provide the requisite degree of resiliency to accommodate secure, rattle-free press-fit engagement of the panel 108c by the support beams 72.

Figure 17:
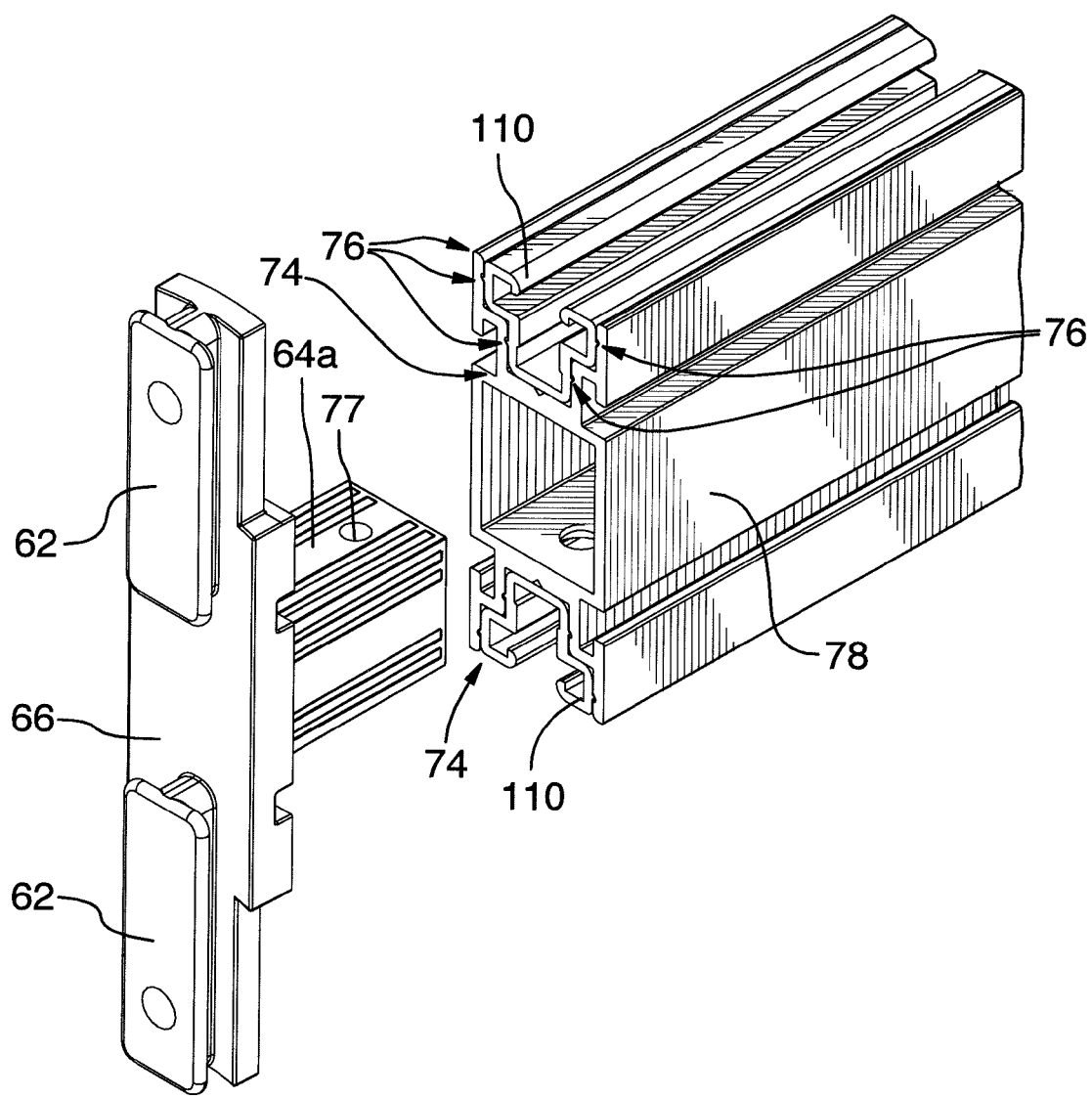
FIG. 17 is a top left perspective view of a composite mounting bracket and of a complimentary end portion of a composite support beam for use therewith.
Figure 18:
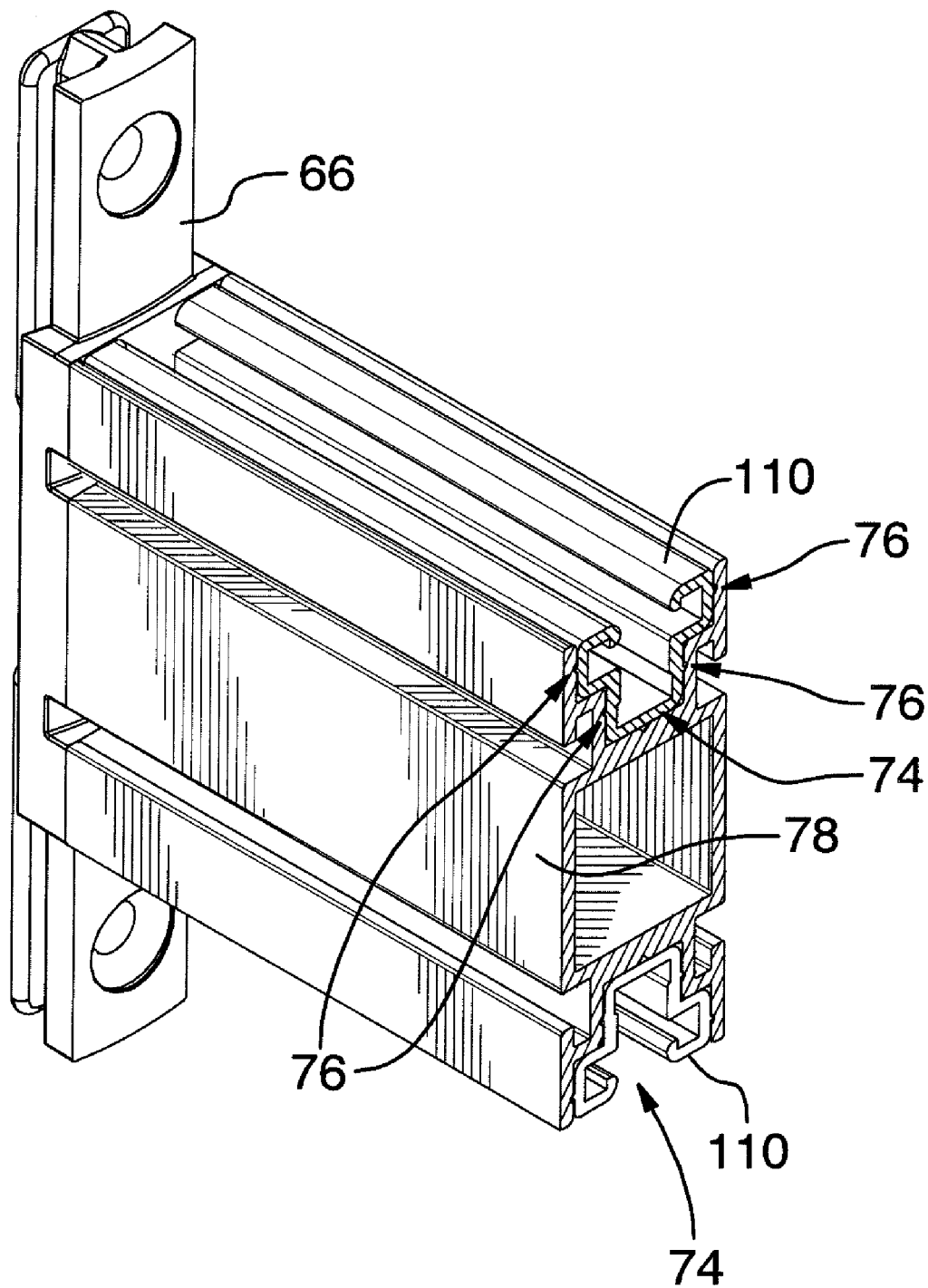
FIG. 18 is a view similar to FIG. 17, with the illustrated components engaging one another.

The system 30 may optionally comprise one or more composite support beams 78, best seen in FIGS. 17 and 18. The composite support beams 78 each have ones of the grooves 74 defined so as to be upwardly and downwardly directed, and to each define complimentary detents 76 therein. The system 30 may additionally comprise two or more composite mounting brackets 66, as best seen in FIGS. 17 and 18, which composite mounting brackets are adapted to matingly engage the composite support beams 78 in a manner similar to that described herein with respect to engagement of the mounting brackets 60 with the support beams 72. The use of such composite beams 76 and composite mounting brackets 66 may serve to facilitate installation by taking the place of two support beams 72 and four mounting brackets 60. As such, time savings may be achieved in installations of a multitude of workstations.

Figure 14:
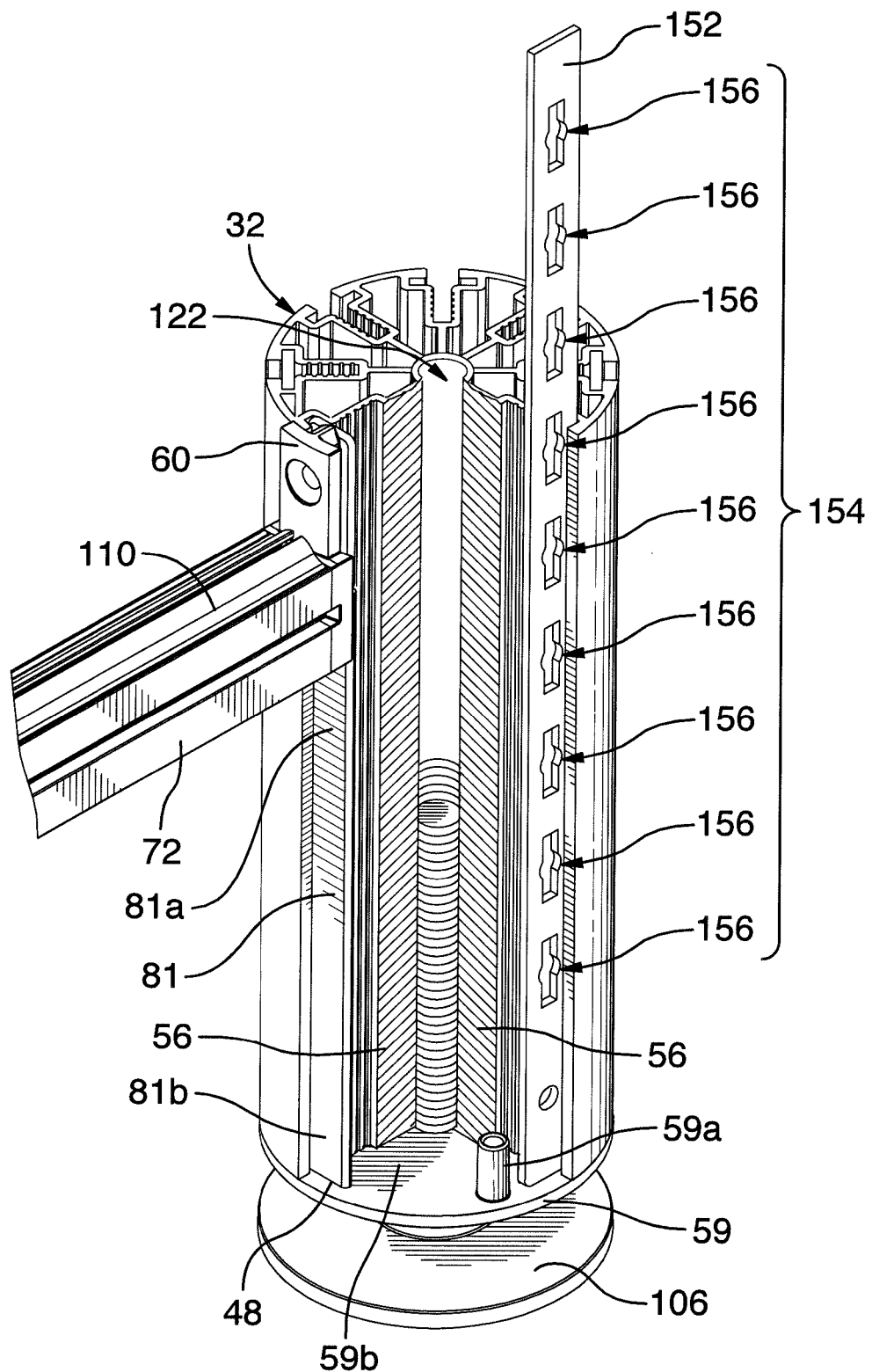
FIG. 14 is a top left perspective view of a column with a portion cut away to show the interior of same.

As best seen in FIG. 14, at least one of the support beams 72 is vertically spaced, at each of the opposite ends 72a thereof, from the bottom end 48 of each of the columns 32 to which it is connected, by means of a first longitudinal spacer member

81. The first longitudinal spacer member 81 may preferably be slidably positionable within the outer channel portion 42 of each channel 40 of the columns 32, so as to have an upper end portion 81a of the firsts longitudinal spacer member 81 in contacting supportable relation with one of the brackets 60. Each first longitudinal spacer member 81 employed at opposite ends 72a of the same support beam 72 may preferably be of substantially the same length so as to substantially level the support beams 72 with which they are used. When slidably positioned in the outer channel portion 42 as aforesaid, the first longitudinal spacer member 81 is restrained against horizontal movement by the first set 34a of the internal wall portion 34, in a similar manner to that described above with respect to the first detent member 62. The first longitudinal spacer members 81 may relatively inexpensively be constructed from plastic materials, or from, for example, aluminum, and are each dimensioned to freely slide, during assembly of the workstation 20, in either vertical direction in a respective one of the outer channel portions 42.

As seen in FIG. 14, the system 30 may further comprise a bottom plate 59, which preferably has a substantially circular cross-sectional profile, similar to that of each of the columns 32. Each bottom plate 59 has a plurality of vertically projecting bosses 59a thereon for engaging the bottom end 48 of the column 32 to which it is respectively attached and otherwise has a substantially flat top surface 59b. A lower portion 81b of the first longitudinal spacer member 81, is positioned in the outer channel portion 42 as aforesaid, and substantially adjacent to the bottom end 48 of the column 32, and is retained thereby against downward movement parallel to the vertical axis.

The system 30 may preferably further comprise an attachment means 82, as best seen in FIG. 4A, which attachment means 82 may preferably be one or more screws 82 which are releasably engagable with the mounting brackets 60 and pass therethrough for engagement with the raised ridges 37 of the second set 34b of wall portions 34 for securing the mounting brackets 60 to the columns 32 in vertically fixed relation thereto. The screws 82 may preferably be dimensioned and otherwise adapted to engage the raised ridges 37 in close fitting deformable relation therewith, as will be appreciated from a consideration of FIG. 4A.

While each column 32 may have a cross-sectional profile (i.e., the shape of perimeter of the column 32 in transverse cross-section) that is, for example, square, rectangular, trapezoidal, and the like, the columns 32 preferably each have a substantially circular transverse cross-sectional profile, as best seen in FIG. 5. Moreover, one skilled in the art will recognize that all of the columns 32 used in a particular application need not necessarily have the same cross-sectional profile.

While shown in FIG. 5 as defining eight channels 40 therein, one skilled in the art will appreciate that columns 32 having a greater cross-sectional area will accommodate the provision of a higher number of channels 40 therein, than may columns 32 having a smaller cross-sectional area. As such, in some applications, more channels 40 than the eight shown in the Figures may be defined in the columns 32. The number of channels 40 defined in any particular column 32 is, as aforesaid, a matter of routine design choice for one skilled in the art; however, columns 32 having more channels 40 defined therein may allow for greater design flexibility, in terms of available angles of attachment of the brackets 60 and support beams 72 thereto. For example, while at least one channel 40 must be defined in each column 32, two or more of same (e.g., the eight shown in the Figures) may be defined and will provide, as aforesaid, greater design flexibility to the user. In addition, while the channels 40 may preferably be arranged, as shown in FIG. 5, in substantially congruent, evenly spaced circumferential relation about the vertical axis A-A, they may be arranged as needed in any specific application. Accordingly, the number of channels 40 and the arrangement of same are matters of routine design choice for one skilled in the art, which choices may be based upon, for example and without limitation, the geometry of an office environment in which the particular embodiment of the invention is to be employed.

It will be appreciated that each support beam 72 will have, as seen in the appended Figures, a respective one of the mounting brackets 60 attached to each end 72a of same. The two mounting brackets 60 attached to the opposite ends 72a of a common support beam 72 may sometimes be referred to herein as a "respective pair" of mounting brackets 60. It will be further appreciated from FIGS. 1, 4 and 4E that adjacent columns 32 will be positioned in a workstation 20 so as to have the outer channel portions 42 of at least one channel 40 opening substantially toward one another, so as to each accept, in sliding relation, the first detent member 62 of one of the respective pair of mounting brackets 60.

Vertically adjacent ones of the support beams 72 may be positioned in parallel spaced relation to one another through the optional employment of a second longitudinal spacer member 88, shown in FIGS. 4F and 10E. The second longitudinal spacer member 88 is preferably positioned in the outer channel portion 42 of a selected channel 40 so as to be, when assembled, interposed between adjacent ones of the support beams 72, with the opposite ends 88a, 88b of the second longitudinal spacer member 88 in contacting relation with the first detent members brackets 60, as best seen in FIG. 4F. The second longitudinal spacer member 88 thereby assists in defining the height of an associated panel space 84. This is particularly advantageous for non-rigid panels, such as, for example, the panels 108b constructed from a single layer of a textile material described hereinabove. The second longitudinal spacer member 88 is, like the first longitudinal spacer member, preferably constructed from plastic materials, or from aluminum, and each dimensioned so as to freely slide in either vertical direction, during assembly, in a respective one of the outer channel portions 42 of a column 32.

Figure 4B:
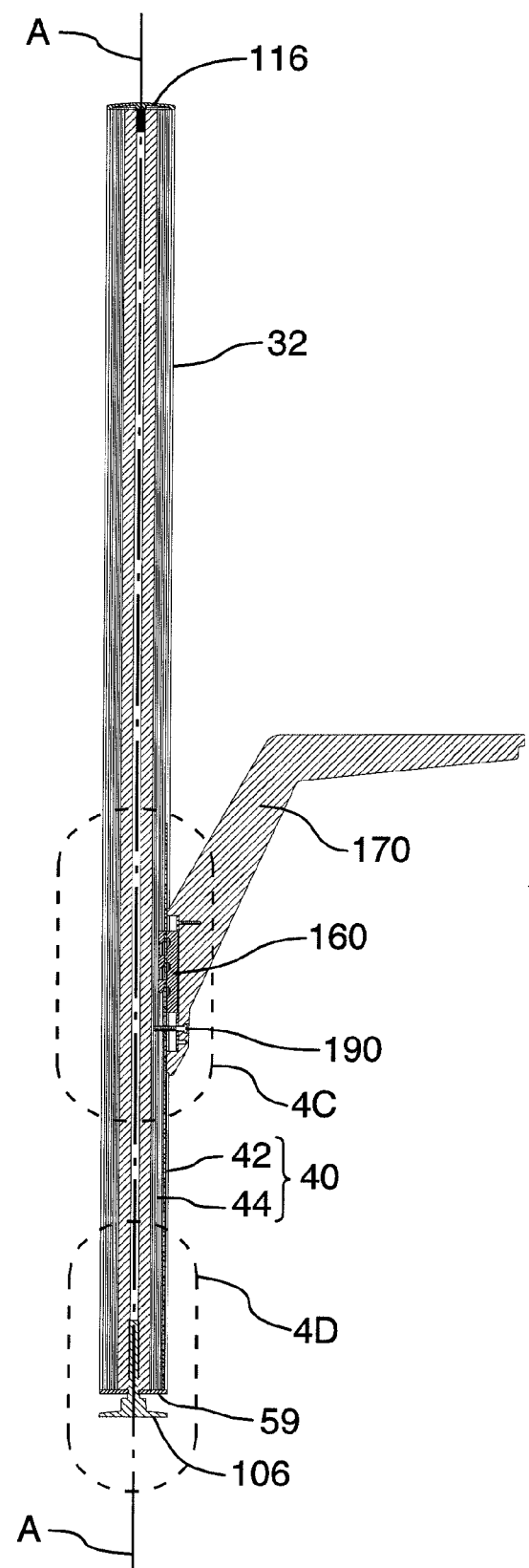
FIG. 4B a sectional view along sight line 4B-4B of FIG. 4.
Figure 4C:
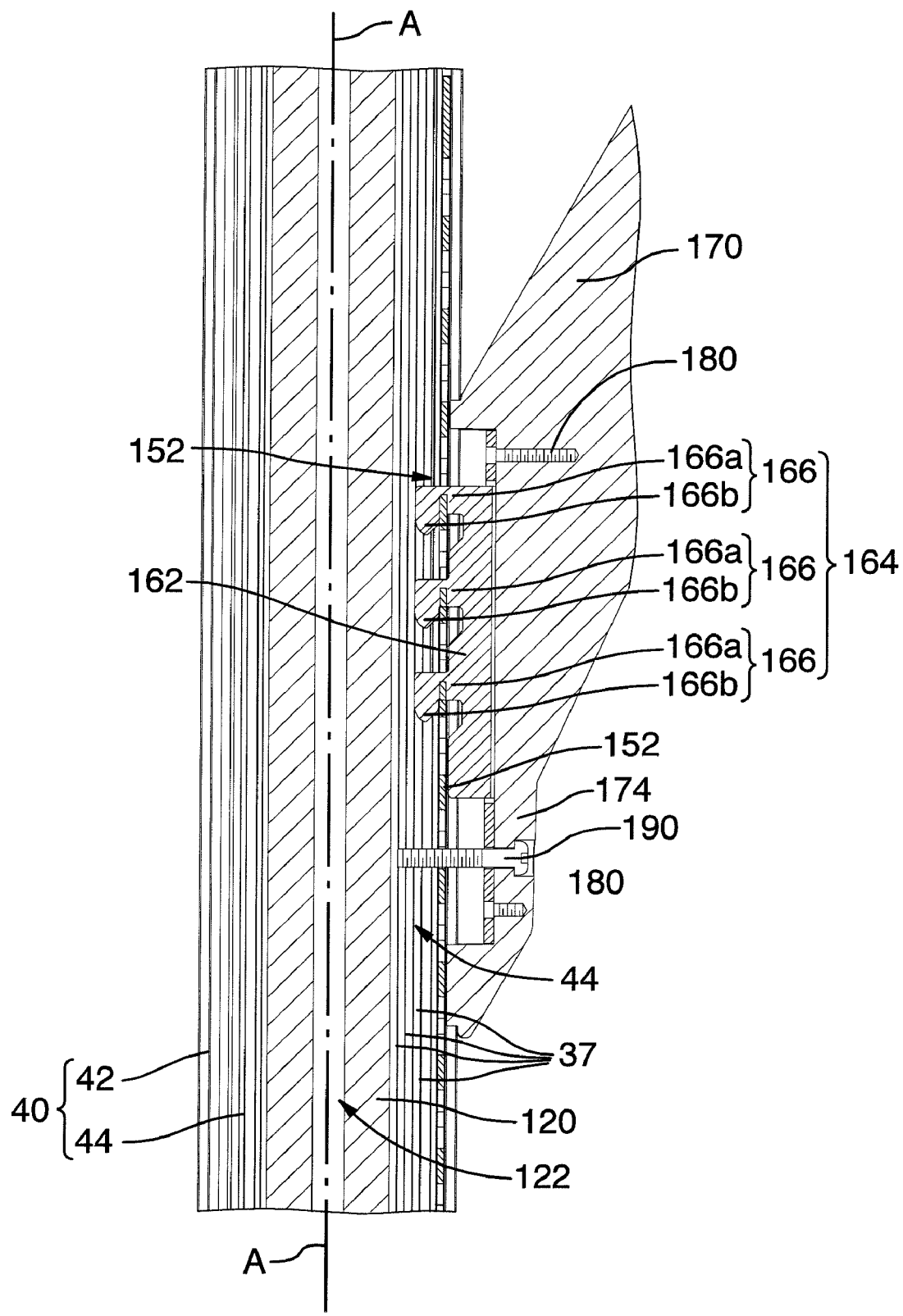
FIG. 4C is an enlarged view of the enclosed area 4C of FIG. 4B.
Figure 4D:
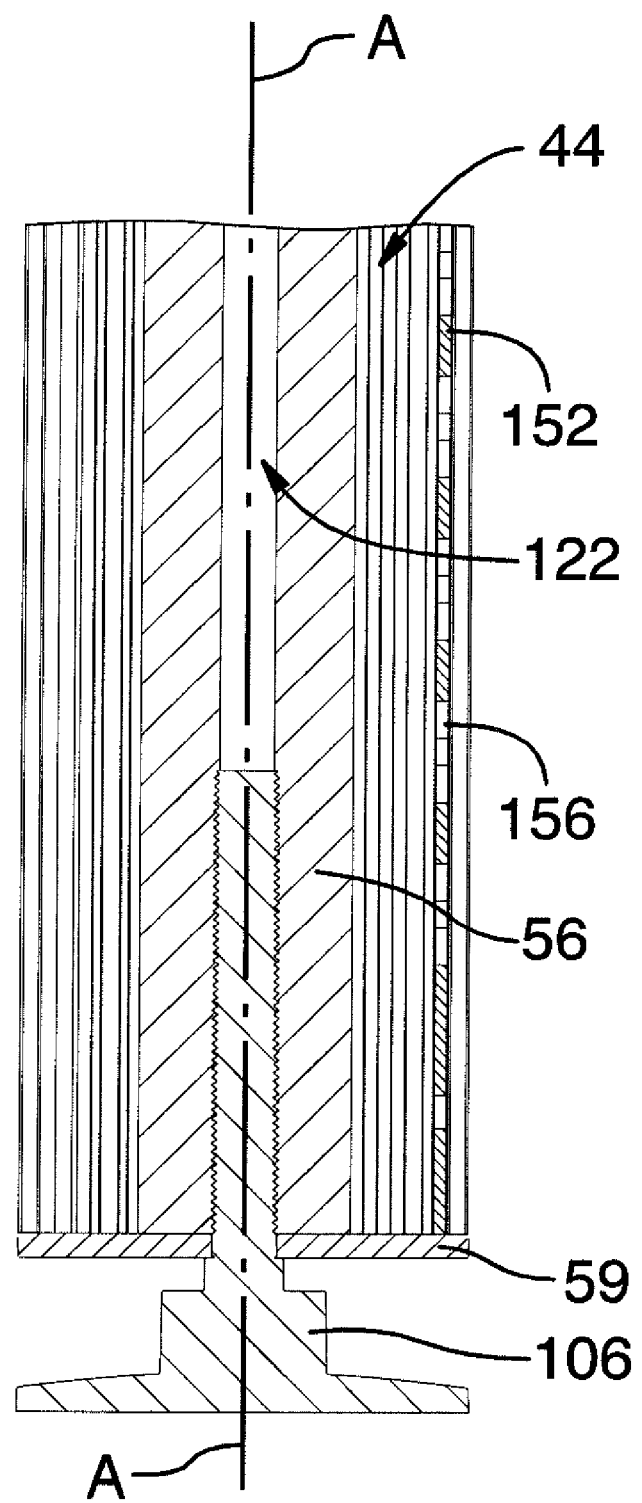
FIG. 4D is an enlarged view of the enclosed area 4D of FIG. 4C.

As best seen in FIG. 5, each of the columns 32 may further comprise a central channel 122 substantially aligned with the column's vertical axis A-A, as best seen in FIG. 4B. The central channel 122 may be adapted to receive an end screw 117 in releasable threaded engagement therein by way of, for example, a plug 118, inserted in press-fit relation within the central channel 122. The plug 118 is adapted by means of an internally threaded bore adjacent a top end of each column 32, to receive the end screw 117 in threaded engagement (see FIG. 4A).

As best seen in FIG. 5, each column 32 may further comprise a plurality of interior walls 56, which interior walls 56 define the central channel 122 and one or more interstitial shafts 58 within the column 32. The interstitial shafts 58 are preferably positioned so as to be between the channels 40, and are also oriented substantially parallel to the vertical axis A-A of the column 32 in which they are defined, with each of the interstitial shafts 58 extending substantially the entire length of same.

Figure 4E:
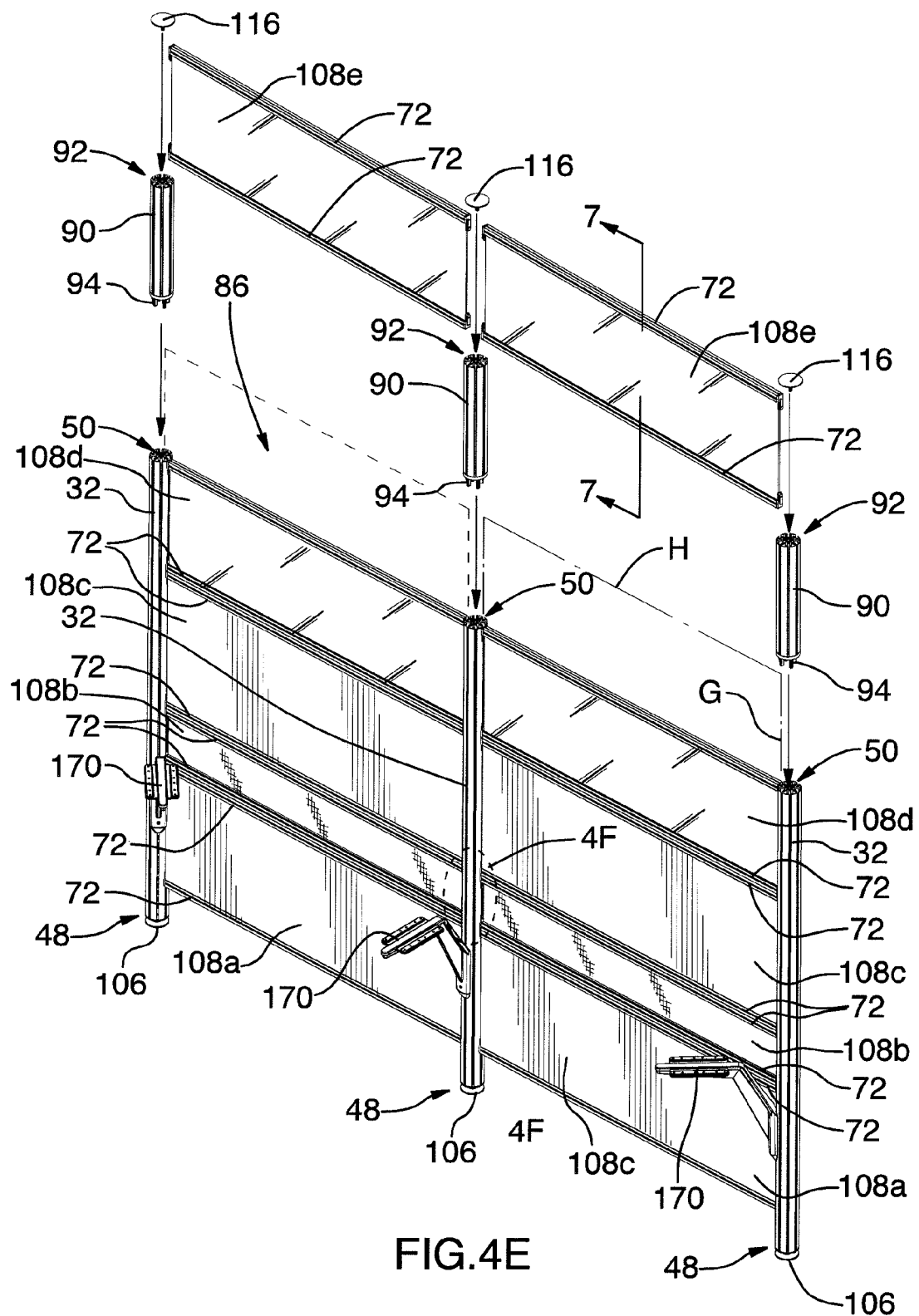
FIG. 4E is a partially exploded perspective view similar to FIG. 4, with extension columns and additional panels shown therein.
Figure 4F:
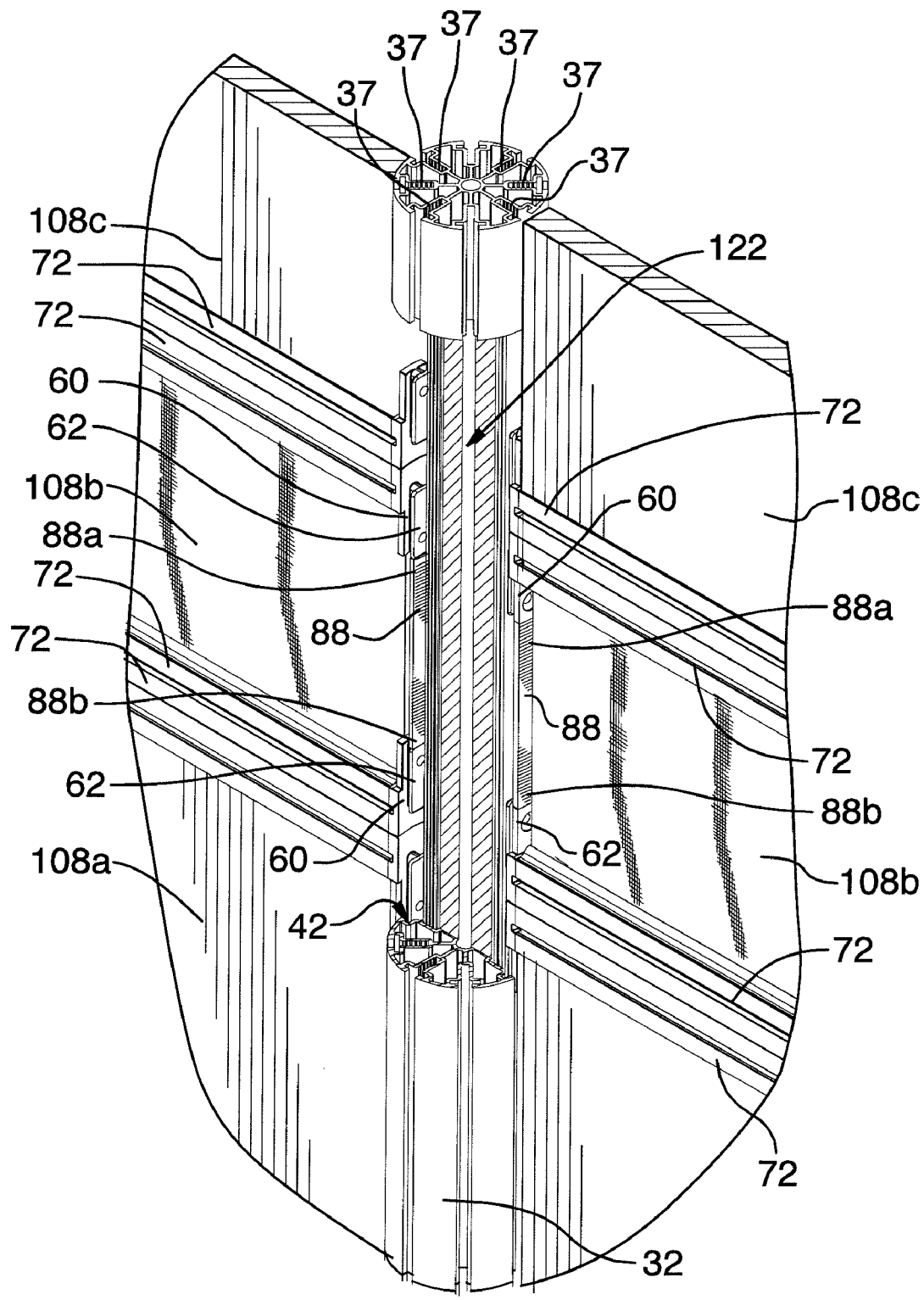
FIG. 4F an enlarged view of the enclosed area 4F of FIG. 4E, with, a portion of the column cut away to better illustrate certain components of the mounting system and their manner of interfacing with the column.
Figure 13:
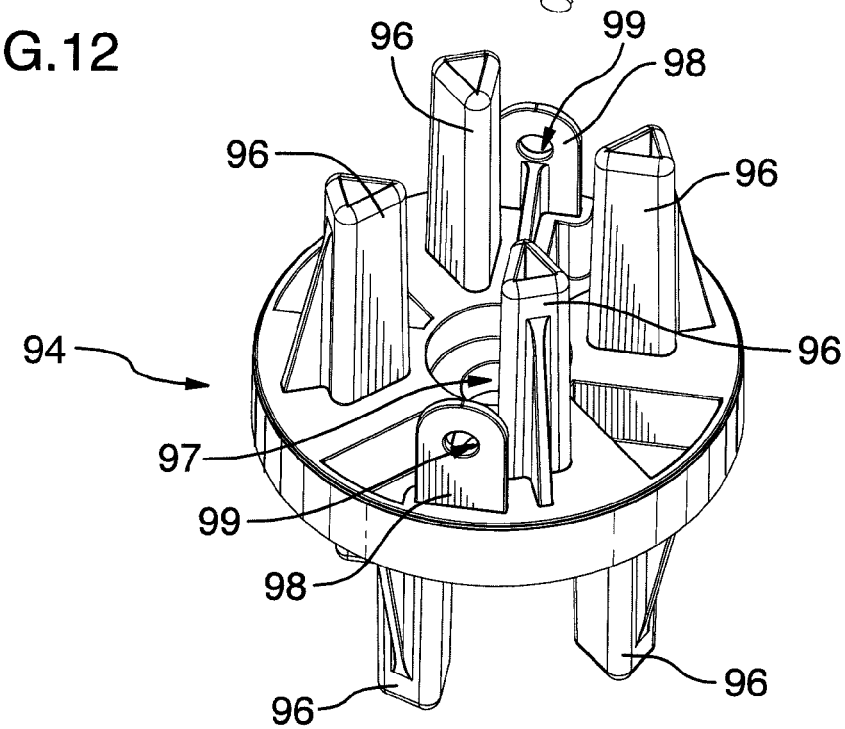
FIG. 13 is a top left perspective view of a column connector according to the present invention.

The system 30 may further comprise extension columns 90, best seen in FIG. 4E, with each of same being respectively removably attachable to the top end 50 of each of the columns 32, each by means of a column connector 94. Each such column connector 94, is interposable between a respective extension column 90 and top end 50 of a subject column 32. As best seen in FIG. 13, the column connector 94 comprises a plurality of tines 96, shaped and configured to be positioned within corresponding ones of the interstitial shafts 58, and to frictionally engage one or more of the interior walls 56, so as to stabilize, particularly against rotation and lateral movement, each column connector 94 to each top end 50. While shown as having four tines 96 oriented in each of upward and downward directions, one skilled in the art will recognize that the column connector need only be provided with one tine 96 oriented in each of the upward and downward directions. In instances where one tine 96 oriented in each of the upward and downward directions, each tine 96 may preferably be shaped and dimensioned so as to engage the interior walls 56 so as to resist against rotation about the vertical axis.

So as to be further stabilized against vertical movement, the column connector 94 may, but need riot necessarily, be attached to the top end 50 by means of the end screw 117 which may, for example, be integral to an end cap 116, and pass through an aperture 97 formed centrally in the column connector 94 to mate with the plug 118 in screw threaded engagement. The column connector 94 may, but need not necessarily, further comprise one or more attachment ears 98 defining side openings 99 therein, as best seen in FIG. 13. Each of the attachment ears 98 is located substantially adjacent to a perimeter of the column connector 94 so as to be vertically slidable within one of the outer channel portions 42 of the channels 40 of the extension column 90. Each attachment ear 99 may preferably be adapted to receive a side screw 100 in throughpassing relation, and the side screw 100 may preferably be adapted, to engage the raised ridges 37 of the second set 34b of the internal wall portions 34 to assist in holding the respective extension column 90 fast to the column connector 94. As will be appreciated from a consideration of FIG. 4E, adjacent ones of the extension columns 90 define top notional wall planes therebetween (such as, for example, that represented by intersecting lines G and H in FIG. 4E). Each of the top notional wall planes may, but need riot necessarily, be substantially parallel to and/or coplanar with one or more of the notional wall planes defined by the columns 32 such as, for example, the first and second notional wall planes shown in FIG. 1, as will be appreciated from a consideration of FIGS. 1 and 4E. While a plurality of the extension columns 90 may be provided, as shown in FIG. 4E, and at least two of same must be provided in order to define, on their own, one top notional wall plane, one skilled in the art will recognize that a single extension column 90 may be employed in some embodiments according to the present invention, with an adjacent column of the same, or higher, vertical height to define a top notional wall plane therebetween.

The extension columns 90 and the columns 32 may preferably all be shaped and otherwise dimensioned so as to have a substantially identical transverse cross-section. As such, analogous versions of all structures described hereinabove as being comprised by the columns 32 may similarly be comprised by each of the extension columns 90.

Support beams 72 may be connected between adjacent extension columns 90 in an analogous manner to that described hereinabove with respect to the columns 32. Top panel spaces 86 between each adjacent pair of extension columns 90 are thus defined, as best seen in dotted outline in FIG. 4E, in a similar manner to that discussed hereinabove with respect to the panel spaces 84. One or more of the panels 108 may be held in one or more of the top panel spaces 86 by the support beams 72, in an analogous manner to that described hereinabove with respect to the panel spaces 84.

The system 30 may further comprise a leveling foot 106, best seen in FIGS. 4D and 14. The leveling foot 106 is adjustably engagable with the bottom end 48 of one or more of the columns 32, for leveling at least one of the support beams 72 attached thereto. As will be appreciated from a review of FIGS. 4D and 14, the central channel 122 may be adapted, adjacent the bottom end 48 of the column 32, to threadingly engage the leveling foot 106. In this manner, the distance of separation between the bottom end 48 of each column 32 and the ground may be adjusted, in the embodiment shown, by rotation of the leveling foot 106 substantially about the vertical axis A-A, so as to lengthen or shorten the amount of same inserted into the respective central channel 122 of the columns 32.

Figures 6, 6A:
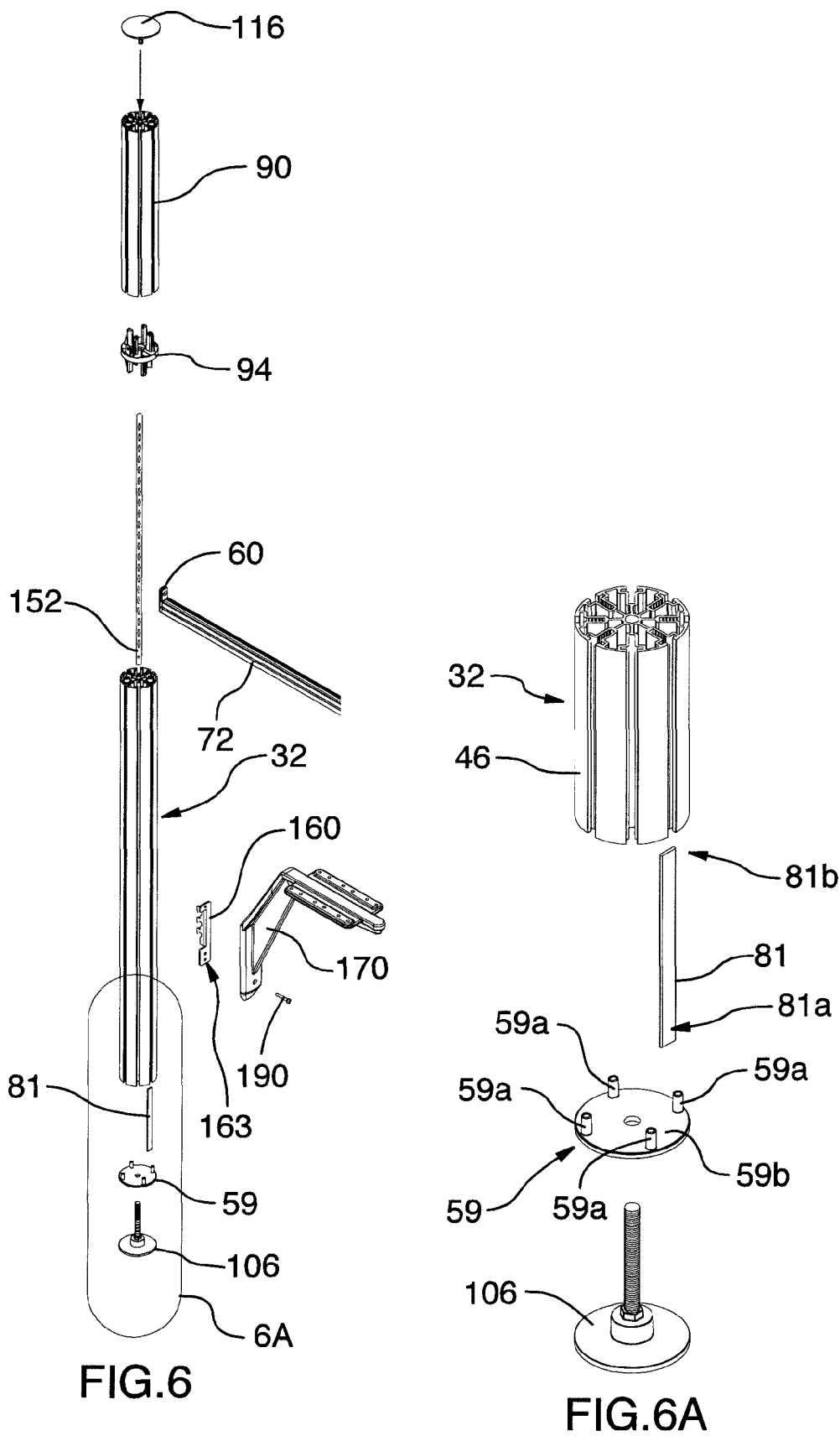
FIG. 6 is an exploded view of the leftmost column and extension column of FIG. 4E.
FIG. 6A is an enlarged with of the enclosed area 6A of FIG. 6.

The system 30 may further comprise the aforementioned end cap 116, with each end cap 116 being adapted to cover the top end 50 of a respective one of the columns 32, as shown in FIGS. 4A and 6. In embodiments of the present invention wherein extension columns 90 are used, the end cap 116 may alternatively be used to cover a top end 92 of same, as will be appreciated from a consideration of FIG. 4E. Each end cap 116 is removably attachable to the top end 50 of one of the columns 32, or the top end 92 of one of the extension columns 90, as the case may be, with the central channel 122 being adapted (for example, by way of the plug 118 described hereinabove) to receive the end screw 117 in releasable threaded engagement therewith. The end screw 117 may, as described hereinabove, be integral to same to the end cap 116, and extends downwardly therefrom as shown in FIG. 4A, with the end screw 117 being engagable with the central channel 122 (e.g., by way of the plug 118 engaged therewith, as described hereinabove).

The system 30 may preferably further comprise one or more longitudinal rail members 152 slidably positionable within the channel 40, preferably, but not necessarily, within the outer channel portion 42 of same, and in contacting relation with the internal wall portions 34, as seen in FIGS. 4C, 5, and 14. The longitudinal rail member 152 may thereby be retained within the channel 40 in substantially parallel relation to the vertical axis A-A. More particularly, one skilled in the art will appreciate that the longitudinal rail member 152 may preferably be restrained against lateral movement by the internal wall portions 34 (i.e., the first set 34a of same) within the outer channel portion 42. One skilled in the art will further appreciate that stability against movement in a vertical plane may be provided by engagement of a bottom end of the longitudinal rail member 152 with the bottom plate 59, as best seen in FIG. 14. While only one longitudinal rail member 152 is shown per column 152 in the Figures, a plurality of longitudinal rail members 152 may be provided (e.g., one in each channel 40 adjacent to which support beams 72 will be engaged). While there preferably may only be one longitudinal spacer member 152 in each channel 40, multiple ones of same may be in each channel, stacked one upon each adjacent other one of same. The total length of all longitudinal spacer members 152 (be it one or more) inserted as aforesaid in any one channel 40 may preferably not exceed the length of the channel 40. The longitudinal spacer members 152 are constructed from a plastic or metal material, and are dimensioned and otherwise adapted to freely slide in both vertical directions in the outer channel portions 142.

The system 30 may preferably further comprise a first set of one or more indexing means 154, preferably, but not necessarily comprised of one or more apertures 156, laid out along the length of each longitudinal rail member 152 in substantially regularly spaced relation to one another, and in directed relation towards the exterior surface 46 of the column 32, as best seen in FIG. 14.

While shown in the appended Figures as all having the same size and shape, the apertures 156 defined in any one longitudinal rail member 152 may be of a plurality of sizes and shapes. The first set of one or more indexing means 154 may alternatively comprise one or more cross members (not shown) horizontally oriented on the longitudinal rail member 152.

Figure 16:
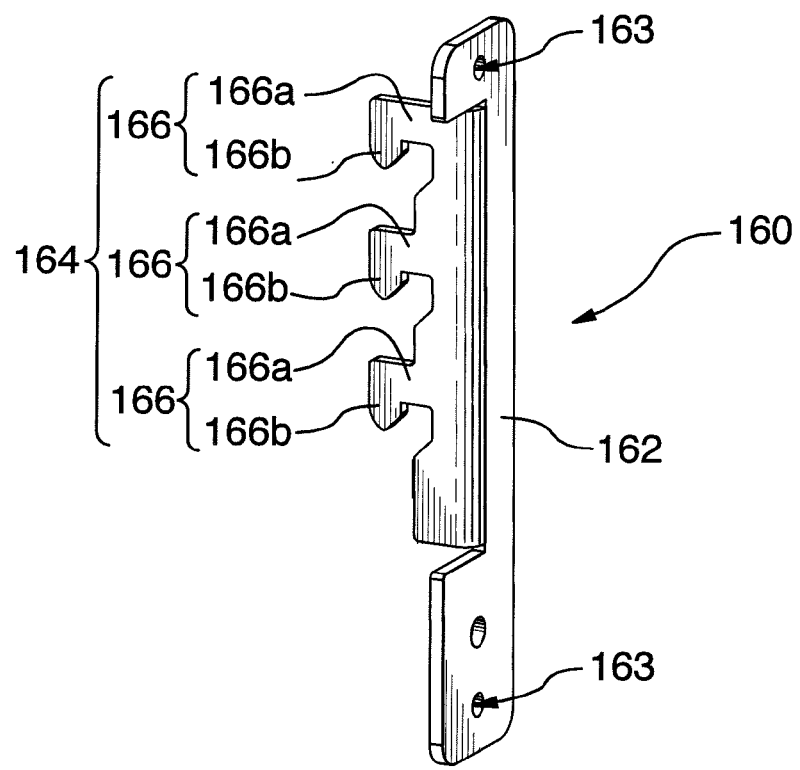
FIG. 16 is a top left perspective view, from the front, of a support bracket for use with the cantilever arm member of FIG. 15.

The system 30 may preferably further comprise at least one support bracket 160 having a main body portion 162 and a second set of one or more indexing means 164 thereon, as best seen in FIG. 16. As also seen therein, the second set of one or more indexing means 164 may preferably, but need not necessarily comprise one or more hook members 166 laterally extending from the main body portion 162 of each support bracket 160, as best seen in FIG. 16. The second set of one or more indexing means 164 is complementary to and matable with the first set of one or more indexing means 154 as will be appreciated from a review of FIGS. 4B and 4C, so as to releasably mount the support bracket 160 on the column 32 in indexed mated relation with the longitudinal rail member 152. The hook members 166 may preferably, but need not necessarily, each be dimensioned and otherwise adapted to respectively engage with a selected one of the apertures 156, as best shown in FIG. 40. A first portion 166a of each of the hook members 166 serves to restrain the support bracket 160 against vertical movement, and a second downturned portion 166b serves to restrain it against horizontal movement when engaged with the apertures 156 as best seen in FIGS. 4C and 16.

The system 30 may preferably further comprise a support arm member 170, which may preferably, but need not necessarily, be a cantilever arm member 170, as best seen in FIG. 15. The support arm member 170 is removably mountable on the main body portion 162 of the support bracket 160, as best seen in FIG. 4C. Turning to FIG. 4C in more detail, the cantilever arm member 170 may preferably be mounted on the main body portion 162 as shown therein with the assistance of one or more cap screws 182, with the cap screws 182 passing through the main body portion 162 of the support bracket 160 and into a lower portion 174 of the cantilever arm member 170. One skilled in the art will recognize that the cantilever arm member 170 may alternatively be suspended from a lip not shown) extending from the main body portion 162 of the support bracket 160 and adapted to engage the cantilever arm member 170, so as to restrain same against movement in a vertical plane.

The system may additionally comprise an auxiliary attachment means 1290 for attachment of the cantilever arm member 170 to the column 32, by way of releasable engagement with the column 32. The auxiliary attachment means 190 may preferably, but need not necessarily, be one or more mounting screws 190, as shown in FIG. 4C, which pass through aligned apertures 163 provided in each of the lower portion 174 and the main body portion 162 prior to making releasable engagement with the column 32 (preferably, but not necessarily, with the internal wall portions 34 thereof). The mounting screws 192 may preferably be dimensioned and otherwise adapted to engage the raised ridges 37 of the second set 34b of the internal wall portions 34 in close fitting deformable relation therewith, as will be best appreciated from a consideration of FIG. 4C. The auxiliary attachment means 190 thereby provides greater stability against movement of the support bracket 160 and the cantilever arm member 170 in the vertical plane. In this regard greater stability is also provided by the cantilever arm member 170 being shaped and configured to substantially match the shaping (i.e., curvature, in the embodiment shown in the Figures) of the exterior surface 46 of the column 32, so as to provide greater stability against lateral and/or rotational movement when affixed thereto as aforesaid.

The support arm member 170 may preferably be dimensioned and otherwise adapted to accept in retained supported relation thereon one or more office furniture accessories 194, which may preferably be selected from the group consisting of work surfaces (shown), shelves (not shown), cabinets (not shown), bins (not shown), and the like. The cantilever arm member 170 may additionally comprise one or more support wings 176 mounted on an upper portion 175 of the cantilever arm member 170, as shown in FIG. 15, with the support wings 176 being adapted for engagement with the office furniture accessories 194 (e.g., the underside of the work surfaces 194 shown in the Figures). One skilled in the art will recognize that different configurations of support arm members 170 may be best configured to retain different types of the office furniture accessories 194. For example, the support wings 176 may not be present on support arm members 170 used to retain cabinets or bins.

Figure 3:
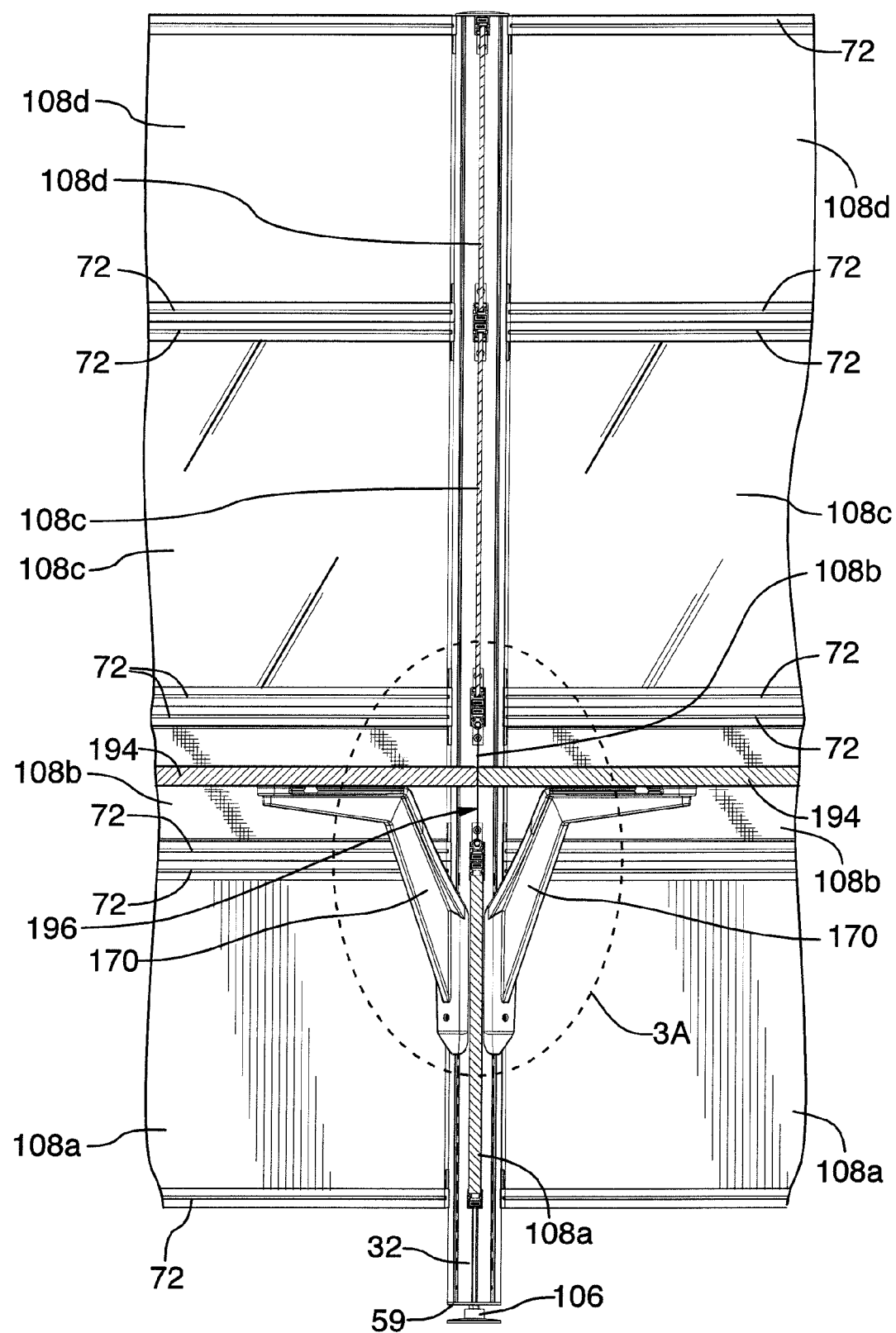
FIG. 3 is partial sectional view along sight line 3-3 of FIG. 2.
Figure 3A:
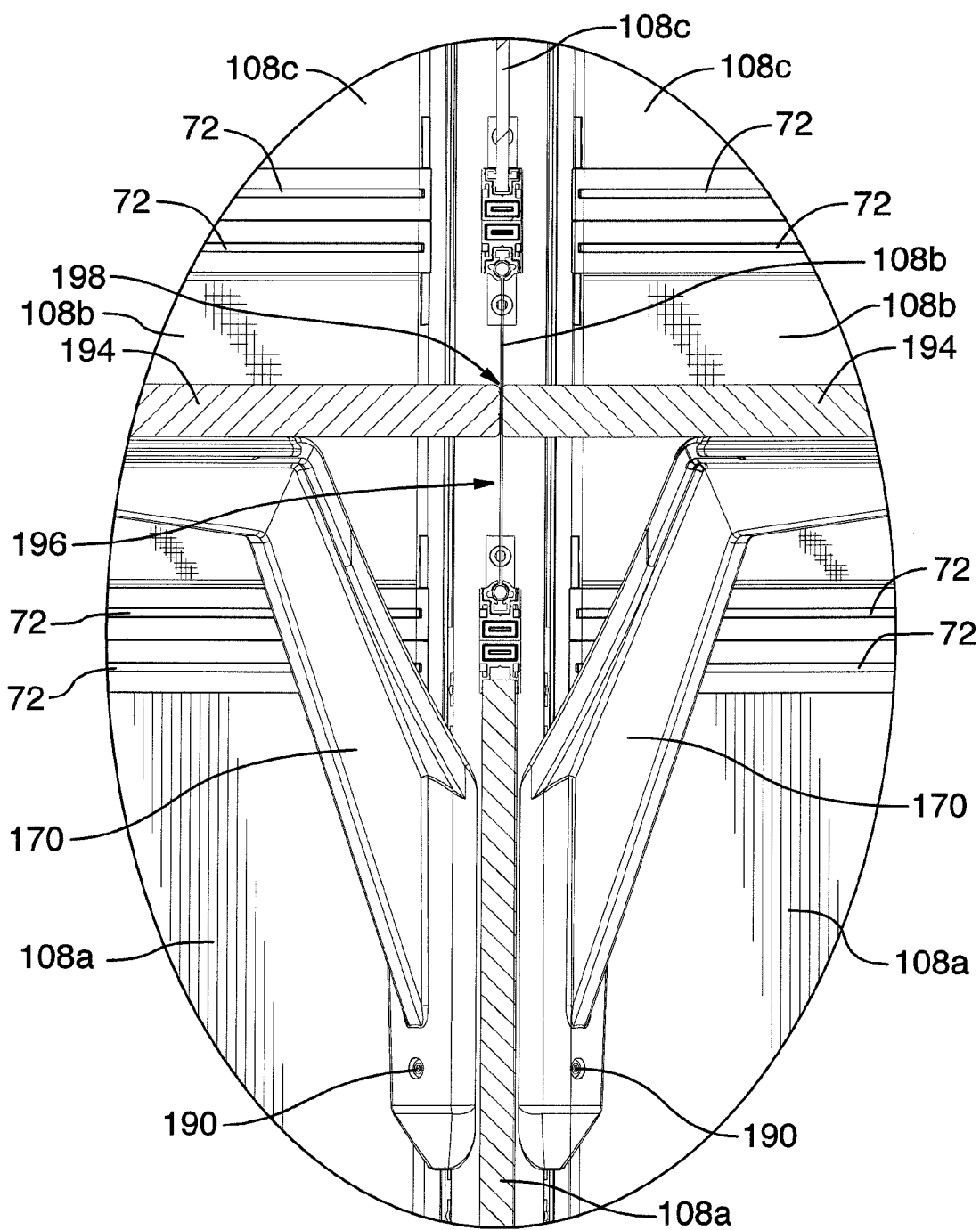
FIG. 3A is an enlarged view of the enclosed area 3A of FIG. 3.

Two of the supports arm members 1.70 may be arranged about a single column 32 so as to support two adjacent office furniture accessories 194, such as the two work surfaces shown in FIGS. 3 and 3A. Each of the work surfaces 194 shown in FIG. 3 is supported by a respective one of the support arm members 170 shown therein, so as to be oriented in juxtaposed relation to the other work surface 194 shown therein, and so as to define a common wall panel space 196 therebetween. As best shown in FIG. 3A the common wall panel space 196 may preferably be occupied by one of the panels 108b constructed from a single layer of a textile material, thereby to minimize the dimension of a space 198 between the two work surfaces 194 (and thus, between the workstations associated therewith). One skilled in the art will recognize that greater than two of the support arms 194 may similarly be employed to support greater than two of the office furniture accessories 194.

Figure 2:
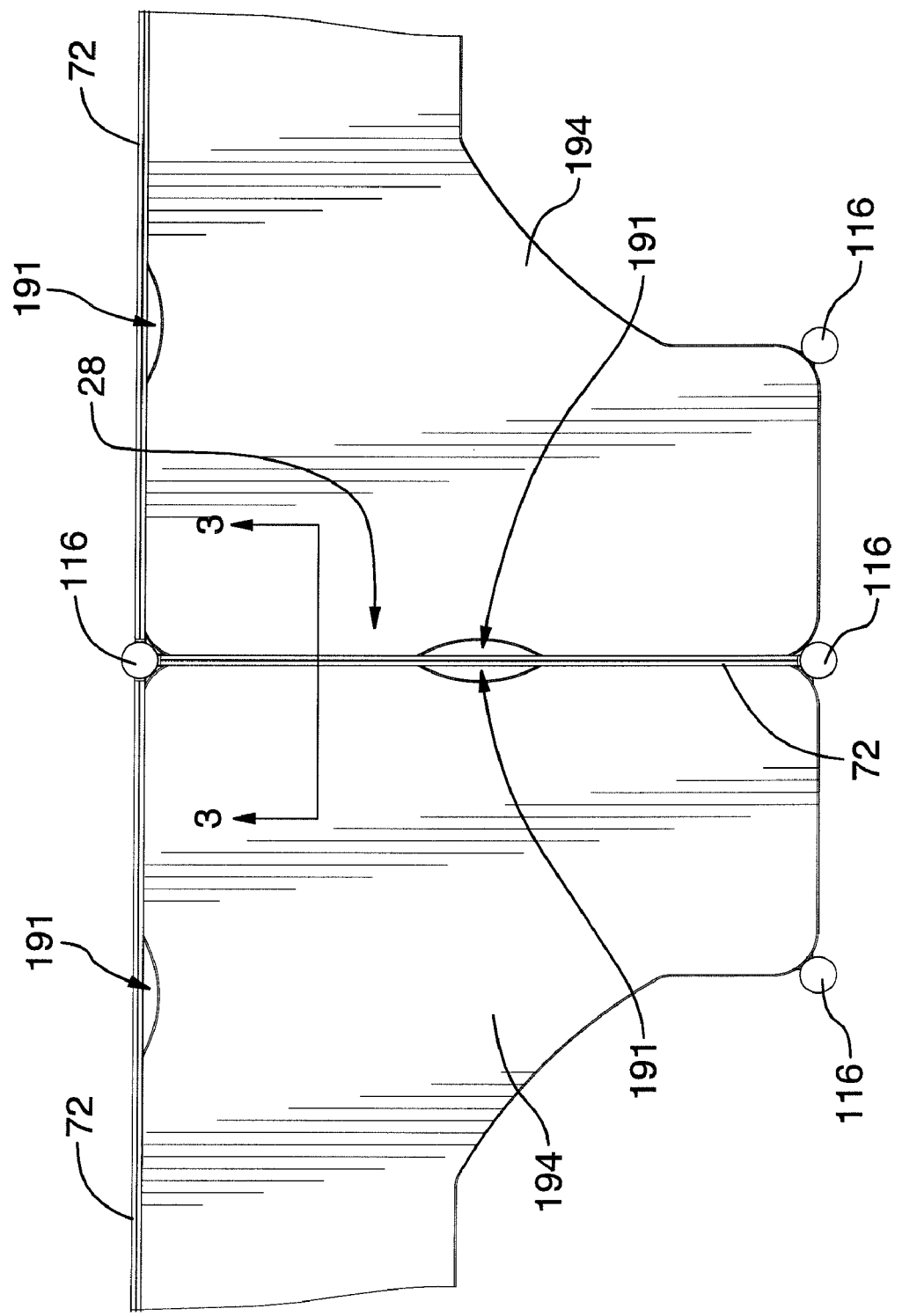
FIG. 2 is a top plan view of a portion of the two work stations of FIG. 1 in the vicinity of a common wall section dividing the two workstations.

As best seen in FIG. 2, one or more curved gaps 191 may be defined by the work surfaces 194 when in use, so as to allow the passage of cables and/or other equipment associated with, for example, computers therethrough.

In use, one first longitudinal spacer member 81 is inserted into each channel 40 of the columns 32 selected by a user to be engaged by one or more of the mounting brackets 60, as described hereinabove. Each first longitudinal spacer member 81 may be so inserted from the top 50 or bottom 48 end of each column, depending upon whether the user has first engaged the bottom cap 59 and leveling foot 106 with the bottom end 48. In any event, each first longitudinal spacer member 81 may be inserted so as to contact the surface 59b of the bottom plate 59 once it is engaged, as described hereinabove. The leveling foot 106 may first be engaged with the bottom cap 59, and the vertically projecting bosses 59a defined on the bottom cap 59 may be frictionally engaged with the bottom end 48 of the column 32, as described hereinabove, so as to provide vertical stability for any items (i.e. the first longitudinal spacer member 81 and the longitudinal rail member 152) to subsequently contact the top surface 59b of same while in one of the channels 40. Each leveling foot 106 employed in a given embodiment may preferably be initially set at substantially the same height, so as to attempt to minimize any changes required later in leveling the support beams 72.

One of the support beams 72 may then be engaged at each of its opposite ends 72a with one of a respective pair of the mounting brackets 60 as described hereinabove, and as will be appreciated from a consideration of FIGS. 10F and 10G.

Once the support beam 72 is so engaged with the brackets 60, the first detent members 62 of each of the mounting brackets 60 attached to same may (on their own, or simultaneously) be slidably inserted into the outer channel portions 42 of the channels 40 such that the groove 74 of the first inserted support beam 72 faces upward. The first detent members 62 may be slidably inserted into opposed aligned channels 40 of adjacent; columns 32, from the respective top end 50 of each of the columns 32, until substantially contacting the first longitudinal spacer members 81 as described hereinabove.

One skilled in the art will recognize that in embodiments where a plurality of columns 32 are being employed (e.g., as shown in FIG. 1) it may be preferable to mount one support beam 72 between each adjacent pair of columns 32 as described hereinabove, and thereafter use the leveling foot 106) provided on each (and a level placed on the support beam 72) to ensure that each support beam 72 is oriented so as to be substantially horizontal, relative to a floor of the office environment (which type of floor may often not be perfectly flat or even substantially so). One skilled in the art will recognize that once the first of the support beams 72 mounted between adjacent ones of the columns 32 has been so leveled, subsequent support beams 72 should not require the taking of similar steps to ensure that each is as level as same, particularly where additional longitudinal spacer members 88 are utilized in association with the installation of said subsequent support beams 72.

One of the panels 108 (preferably the rigid uncovered panel 108a, for the reasons described hereinabove) would then be engaged from above with the support beam 72. As described hereinabove, the specific mode of engagement will vary depending upon which type of panel 108 is engaged with the support beam 72. For example, when using panels 108 to be installed without the flexible mounting strips 110, such as for example the rigid uncovered panels 108a, the panel 108a may be positioned in the upwardly facing groove 74 (so as to be held therewithin, as described hereinabove), as will be appreciated from a consideration of FIGS. 11A and 11B. One skilled in the art will recognize that the application of some downward force on the panel 108a may be necessary in order to position same with the groove 74. Another of the support beams 72 (engaged with mounting brackets 60 as described hereinabove) may then be placed above the panel 108a and slid downwardly into engaged relation therewith in a similar fashion as was the beam 72 placed below, only with the groove 74 therein facing downwards so as to allow similar engagement of the panel 108a.

In embodiments wherein the flexible mounting strips 110 are employed, and particularly where the type of panel 108 to be employed therein is substantially rigid (e.g., those designated in the Figures and previously described with reference to the numerals 108a, 108c, 108d, and 108e), the flexible mounting strips 110 may first be engaged with the panel 108 as shown in, for example, FIGS. 8A and 9. The flexible mounting strip 110 with the attached panel may then be engaged with the upwardly facing groove 74 of the support beam 72 previously mounted between the columns 32, as will be appreciated from a consideration of FIGS. 8A and 7A. A respective pair of the mounting brackets 60 mounted on another of the support beams 72 may then be engaged with ones of the outer channel portions 42 of the channels 40 (by way of the first detent members 62 therein) so as to be slid downwardly therein until press-fit engagement (as described hereinabove) with the flexible mounting strip 110 (already mounted on the panel) therebelow is achieved.

In embodiments wherein the lowest panel 108 (or any panel employed) comprises a single layer of textile material panel 108b, one of the second longitudinal spacer members 88 may first need to be inserted into each of the respective outer channel portions 42 of the channels 40 having the first detent member 62 of the mounting bracket 60 engaged therewith, so as to contact same. Each second longitudinal spacer member 88 may preferably be of such a length as to allow for holding of the fabric panel 108a in such a manner that it is stretched substantially parallel to the vertical axis A-A and is, once installed, substantially taut, as will be appreciated from a consideration of FIG. 10E. The respective pair of mounting brackets 60 engaged with each end 72a of another of the support beams 72 may then be engaged with ones of the outer channel portions 42 of the channels 40, as described hereinabove, and so as to have each of the first detent members 62 of the mounting brackets 60 substantially contact the second longitudinal spacer member 88 positioned in the same outer channel portion 42. The attachment means 82 may, but need not necessarily, then be engaged, as described hereinabove, with the mounting brackets 60 engaging the support beams 72, prior to press-fit engagement of the flexible mounting strips 110 with the respectively upwardly and downwardly facing grooves 74 of the support beams 72, so as to provide greater support and stability for any additional beams 7a and/or panels 108 which may be positioned above same.

The dowel rods 109 shown in FIG. 10E may be engaged with the sleeves 111 (also shown in FIG. 10E) prior to engagement of the panels 10a constructed from a single layer of a textile material with the flexible mounting strips 110. The flexible mounting strips 110 may then be engaged to the sleeves 111 and may then be engaged with the grooves 74 of the support beams 72, as will be appreciated from a consideration of FIGS. 10B and 10D, such that the detents 112 and complimentary detents 76 engage one another in releasable press-fit engagement, as described hereinabove. One skilled in the art will recognize that in instances wherein ones of the panels 108 that may be substantially rigid (i.e., those designated in the Figures by reference numerals 108a, 108c, 108d, and 108e) are employed, the attachment means 82 need not be engaged as described hereinabove, as the upper support beam 72 associated with such a rigid panel will be supported by the rigid core of the panel.

While shown in FIG. 1 as oriented substantially parallel or perpendicular to one another, the panels 108a, 108b, 108c, 108d, and 108e mounted on the columns 32 mea be oriented to each other at any angle allowable based upon the configuration of the channels 40 within the respective columns 32 to which they have been mounted (as selected by the user) as described hereinabove.

The end caps 116 may be attached as described hereinabove to the top ends 50 of the columns 32, preferably once all of the panels to be installed between each pair of columns 32 (i.e, making up the particular wall section 28) and all of the longitudinal rail members 152 (described more fully below) have been installed on that column 32. As seen in FIG. 4A, the end caps 116 may contact the uppermost support beam 72 of a wall section 28, thereby to assist in holding all panels 108 therebelow in stacked vertical relation between adjacent columns 32.

Each longitudinal rail member 152 (of which there may be a plurality, as described hereinabove) may be slidably inserted into one of the outer channel portions 42 of the channels 40 as described hereinabove, and as will, be appreciated from a consideration of FIGS. 6 and 15, so as to engage the top surface 59 of bottom plate 59 as shown in FIG. 14. The support bracket 160 may be attached to the support arm member 170 (preferably the cantilever arm member 170 described hereinabove) as shown in FIG. 4B using the cap screws 180. The support bracket 160 and cantilever arm member 170 may then be attached to the column 32 as an assembly by engagement of the hook members 66 with selective ones of the apertures 156, as described hereinabove and as will be appreciated from a consideration of FIGS. 4B and 4C. In some embodiments of the present invention, the longitudinal rail member 152 may have indicia (not shown) marked thereon to facilitate mounting of different support brackets 160 at substantially uniform heights on different columns 32. In any event, this can be relatively easily achieved with reference to the number of apertures 156 above the top surface 59b of the bottom plate 59. The mounting screws 192 making up the auxiliary attachment means 190 may then be engaged with the raised ridges 37 of the second set 34b of internal wall portions 34, as described hereinabove, so as to fix the support bracket 160 and the cantilever arm member 172 to the column 32, as shown in FIG. 3A. The office furniture accessories 194 (e.g., the work surfaces 194 shown FIGS. 1, 2, 3, and 3A) may then be affixed to, or otherwise mounted upon, the support arm member 170. As will be appreciated from a consideration of FIG. 4, the positioning of the support brackets and cantilever arm members 170 attached thereto are limited only by the placement of the channels 40 in the columns 32. The user may choose to attach ones of the cantilever arm members 170 in a manner as aforesaid, preferably positioned in the outer channel portion 42 of the channels 40 so as to allow mounting of one of the single layer of textile material panels 108b therebetween so as to minimize (as described hereinabove) the size of the space 198 shown in FIG. 3A between the adjacent work surfaces 194.

Ones of the extension columns 90 may be attached by first engaging the column connector 94 to the top end of the column 32 as aforesaid, with the extension column 90 being attached to the column connector 94 before or thereafter. In order to so attach ones of the extension columns 90 to the top ends 50 of any of the columns 32, the end caps 116 must, of course, be removed (if they had previously been installed). One skilled in the art will recognize that the extension columns 90 may be installed during, or subsequent to, initial installation of a system 30 according to the present invention. As the installation of the column connector 94 may preclude insertion of, for example, the longitudinal rail member into the channels 40, such structures may preferably be installed prior to installation of any column connectors 94 and extension columns 90. One skilled in the art will recognize that the extension columns 90 may preferably be installed so as to have the channels therein substantially aligned with those of the column 32 below. One skilled in the art will thus further recognize that engagement of ones of the panels 108a, 108b, 108c, 108d, and 108e between the extension columns 90 may be accomplished using substantially the same steps (for example, the first longitudinal spacer member 81 may not be necessary) as were described hereinabove with respect to installation in the columns 32. The end cap 116 may then be installed on the top end 92 of each of the extension columns 90 employed in any particular embodiment of the present invention.

One skilled in the art will recognize that the user may similarly install additional ones of the support beams 72, panels 108 (types to be chosen by the user), support brackets 160 (with the cantilever arm members 170 attached thereto), and extension columns 90 in the respective manners described herein above, in other or the same channels 40 of different or the same columns 32 so as to assemble a plurality of workstations 20 (including wall sections 28 and office furniture accessories, and, in some instances, separated by common wall sections 29) such as those shown in FIG. 1. One skilled in the art will recognize that common wall sections 29 may serve not only to provide greater structural stability to the workstation 20, but to regulate noise between adjacent, and other, workstations 20.

The cumulative height of the panels 108 installed between any two columns 32 may preferably substantially match the height of the shortest of those columns 32. One skilled in the art will similarly recognize that, to disassemble a system such as that shown in FIG. 1, the user may perform substantially the opposite of the operations described hereinabove, in substantially the opposite order.

Other modifications and alterations may be used in the design and manufacture of other embodiments according to the present invention without departing from the spirit and scope of the invention, which is limited only by the accompanying claims. For example, while described as needing two columns 32 to define a plane, a user may adapt a structural wall of an office to engage one end of a support beams 72, while the opposite other end 72a is engaged by a mounting bracket 60 slidably engaging with the channel 40 of a single column 32 (in the general manner described hereinabove), so as to divide an office environment.

We claim:

1. A mounting system comprising:
a) at least two columns each having a top end and a bottom end with a vertical axis extending therebetween, with said at least two columns defining a first notional wall plane extending between the columns;
b) each said column having internal wall portions which together define at least one channel within the column, with each said channel extending substantially parallel to said vertical axis and with each said channel having an outer channel portion opening laterally to an exterior surface of said column and an inner channel portion opening from and extending inwardly from said outer channel portion with said outer channel portion being wider than said inner channel portion, wherein, said internal wall portions comprise a first set of internal wall portions defining each said outer channel portion of each said channel and a second set of internal wall portions defining each said inner channel portion of each said channel;
c) one or more mounting brackets each having a first detent member slidably positionable within said channel and engageable with said internal wall portions for fixing each of said mounting brackets against rotation transverse to said vertical axis;
d) one or more support beams being substantially aligned with said first notional wall plane, and with said support beams being releasable connected at either of their opposite ends to said mounting brackets, wherein at least one of said support beams is vertically spaced at each of said opposite ends thereof from the bottom end of each of said at least two columns by means of at least one first longitudinal spacer member slidably positionable within the outer channel portion of each of said at least two columns so as to have an upper end portion of said at least one first spacer member in contacting supportable relation with said brackets; and,
e) one or more attachment means releasably engagable with the mounting brackets and with the second set of internal wall portions for securing the mounting brackets to the columns in vertically fixed relation.

2. A system according to claim 1, wherein said second set of internal wall portions are shaped and dimensioned to define at least one raised ridge thereon.

3. A system according to claim 2, wherein said second set of internal wall portions comprises two internal wall portions arranged in substantially opposed parallel relation one to the other to define the width of said inner channel portion.

4. A system according to claim 3, wherein said at least one raised ridge is present on each of said two inner internal wall portions.

5. A system according to claim 4, wherein said at least one raised ridge comprises a plurality of raised ridges and wherein said attachment means comprises one or more screws dimensioned and otherwise adapted to engage said raised ridges in close-fitting relation therewith.

6. A system according to claim 4, wherein said exterior surface of each of said columns has a substantially circular transverse cross-sectional profile.

7. A system according to claim 6, wherein said inner channel portion is of substantially rectangular cross-section, with its major axis extending inwardly from said outer channel portion on a radial plane of said column.

8. A system according to claim 7, wherein said outer channel portion is of substantially rectangular cross-section with its major axis intersecting said major axis of the inner channel in substantially perpendicular relation thereto.

9. A system according to claim 8, wherein said at least one channel comprises two or more channels.

10. A system according to claim 9, wherein said two or more channels are arranged in substantially congruent, evenly spaced circumferential relation about said vertical axis.

11. A system according to claim 10, wherein said two or more channels comprises eight channels.

12. A system according to claim 10, wherein said support beams are each releasably connected at opposite ends of same to a respective mounting bracket by means of a fixation means associated with each said mounting bracket.

13. A system according to claim 12, wherein said fixation means comprises a flange on each mounting bracket slidably engageable with a respective end of each of said support beams.

14. A system according to claim 13, wherein said fixation means further comprises one or more machine screws passing through a suitably sized aperture formed in the support beam to engage an alignable threaded socket formed in said flange, so as to hold said flange in frictionally retained relation against the respective support beam.

15. A system according to claim 13, wherein two vertically adjacent ones of said support beams are substantially aligned with said first notional wall plane, each being connected as aforesaid to said mounting brackets, with said two vertically adjacent ones of said support beams being in substantially parallel spaced relation to one another so as to define a panel space therebetween.

16. A system according to claim 15, wherein said two vertically adjacent ones of said support beams are positioned in said parallel spaced relation to one another by means of a second longitudinal spacer member positioned in the outer channel portion of a selected channel of each of said columns so as to be interposed therebetween with its opposite ends in substantially contacting relation each with a respective one of the first detent members of the mounting brackets attached to said two vertically adjacent ones of said support beams.

17. A system according to claim 15, wherein said at least one column further comprises a third column, with said third column defining, with one of said two columns, a second notional wall plane extending therebetween, with one or more of said support beams being substantially aligned with said second notional wall plane and being connected as aforesaid at each of the opposite ends of same to a respective pair of said mounting brackets.

18. A system according to claim 17, wherein each mounting bracket of said respective pair of mounting brackets engages one channel of a pair of said channels, with a respective one of said two columns and said third column defining each channel of said pair of channels, such that the outer channel portions of said pair of channels open substantially towards each other.

19. A system according to claim 18, wherein a plurality of said support beams define, by respective vertically adjacent pairs of said support beams positioned in said substantially spaced relation with one another, a plurality of said panel spaces between said two columns and between said third column and said one of said two columns.

20. A system according to claim 19, further comprising one or more extension columns, with each of said extension columns being removably attachable to the top end of a respective one of said two columns and said third column by means of a column connector, with said column connector being interposable between each of said extension columns and each said top end.

21. A system according to claim 20, wherein said one or more extension columns comprises at least two extension columns, with adjacent pairs of same each together defining a top notional wall plane.

22. A system according to claim 21, wherein each of said top notional wall planes is substantially parallel with at least one of said first notional wall plane and said second notional wall plane.

23. A system according to claim 19, wherein each of said two columns and said third column further comprise a plurality of interior walls defining one or more interstitial shafts therein, with said interstitial shafts being positioned between said at least one channel in substantially parallel relation to each said vertical axis, and with said plurality of interior walls further defining a central channel therein substantially aligned with each said vertical axis, with said central channel being adapted to accept an end screw therein in releasable threaded engagement therewith.

24. A system according to claim 23, wherein said extension columns, said two columns and said third column are all shaped and otherwise dimensioned so as to have a substantially identical transverse cross-section.

25. A system according to claim 24, wherein, said mounting brackets are slidably positionable as aforesaid in at least one of said extension columns.

26. A system according to claim 25, wherein two or more of said support beams are substantially aligned with each of said top notional wall planes and each connected as aforesaid to said mounting brackets, with each in said substantially parallel spaced relation to one another so as to define one or more top panel spaces therebetween.

27. A system according to claim 26, wherein said column connector comprises a plurality of tines shaped and configured to be positionable within said interstitial shafts so as to frictionally engage one or more of said interior walls of the top end of a respective column, so as to stabilize each said column connector atop each top end.

28. A system according to claim 27, wherein said column connector is attached to said top end by means of said end screw.

29. A system according to claim 28, wherein said column connector comprises one or more attachment ears defining side openings therein, with each of said attachment ears being located substantially adjacent to a perimeter of said column connector so as to be vertically slidable within an outer channel section of a respective top end.

30. A system according to claim 29, wherein each said attachment ear is adapted to receive a side screw in through-passing relation, and said side screw is adapted to engage said raised ridges in releasable threaded engagement therewith.

31. A system according to claim 10 further comprising a leveling foot adjustably engagable with the bottom end of one or more of said columns for assistance in leveling at least one of said support beams.

32. A system according to claim 23, further comprising one or more end caps for respectively covering the top end of each of said columns.

33. A system according to claim 32, wherein each said end cap is removably attachable to said top end of each of said columns by means of said end screw, with said central channel being adapted to accept the end screw in releasable threaded engagement.

34. A system according to claim 29, further comprising one or more end caps for respectively covering a top end of each or said extension columns.

35. A system according to claim 30, further comprising a plurality of panels, with one or more of said panels held in one or more of said panel spaces by said support beams.

36. A system according to claim 35, wherein one or more of said panels is held in one or more of said top panel spaces by said support beams.

37. A system according to claim 34, wherein each said end cap is removably attachable to said top end of each of said extension columns by means of said end screw, with said central channel of said extension column being adapted to accept the end screw in releasable threaded engagement.

38. A system according to claim 35, wherein said panels comprise panels selected from a group of panels constructed: from a single layer of textile material; from a substantially translucent material; from a substantially transparent material; with a substantially rigid core covered on its outer faces by a textile material; and, from a substantially rigid core material not covered on its outer faces by textile materials.

39. A system according to claim 38, wherein said panels further comprise one or more flexible mounting strips attached to one or more vertical edges thereof, with each of said flexible mounting strips being adapted for releasable press-fit engagement with a respective one of said support beams.

40. A system according to claim 39, wherein said support beams each define one or more grooves therein for receiving said flexible mounting strips in said releasable press-fit engagement.

41. A system according to claim 40, wherein said flexible mounting strips define one or more detents thereon, with said grooves defining one or more complimentary detents thereon, and with said detents being adapted to mate with said complimentary detents.

42. A system according to claim 38, wherein said single layer of textile material is a polyvinyl chloride mesh material.

43. A system according to claim 1, wherein at least one of said support beams comprises a composite support beam, with said composite support beam defining upwardly and downwardly facing grooves therein, with each of said grooves defining one or more complimentary detents therein, wherein said composite support beam is adapted to receive a flexible mounting strip in each of said grooves in releasable press-fit engagement therewith, wherein each said flexible mounting strip defines one or more detents therein, with said detents being adapted to mate with said complimentary detents, and wherein said composite support beam is releasably connected at opposite ends of same to a respective mounting bracket by means of a fixation means associated with said mounting bracket.

44. A system according to claim 43, wherein each said respective mounting bracket comprises a composite mounting bracket, wherein said composite mounting bracket, and wherein said system further comprises an attachment means releasably engagable with said composite mounting bracket for securing same to the columns in vertically fixed relation.

45. A system according to claim 44, wherein said fixation means comprises a flange on said composite mounting bracket slidably engagable with a respective end of said composite support beam, and one or more machine screws passing through a suitably sized aperture formed in the composite support beam to engage an alignable threaded socket formed in said flange, so as to hold said flange in frictionally retained relation against said composite support beam.

46. A mounting system comprising:
a) at least one column having a top end and a bottom end and defining a vertical axis extending therebetween;
b) each said column having internal wall portions which together define at least one channel within the column, with each said channel extending substantially parallel to said vertical axis and with each said channel having an outer channel portion opening laterally to an exterior surface of said column and an inner channel portion opening from and extending inwardly from said outer channel portion with said outer channel portion being wider than said inner channel portion;
c) a longitudinal rail member slidably positionable within said outer channel portion in laterally retained contacting relation with said internal wall portions to retain said rail member within said outer channel portion in substantially parallel relation to said vertical axis;
d) a first set of one or more indexing means comprised of one or more apertures laid out along the length of said longitudinal rail member in substantially regularly spaced relation to one another and in directed relation towards said exterior surface of said column;
e) at least one support bracket having a main body portion and a second set of one or more indexing means thereon, said second set being complementary to and matable with said first set of indexing means and comprising one or more hook members laterally extending from the main body portion of each said support bracket, said hook members each being dimensioned and otherwise adapted to respectively engage with a selected one of said apertures so as to releasably mount said support bracket on the column in said indexed mated relation with said rail member so as to releasably mount said support bracket on the column in indexed mated relation with said rail member; and
f) a cantilever arm member removably mountable on said main body portion with the assistance of one or more cap screws passing through the main body portion of the support bracket and into a lower portion of the cantilever arm member.

47. A system according to claim 46, additionally comprising an auxiliary attachment means for attachment of said cantilever arm member to said column by way of releasable engagement with said column.

48. A system according to claim 47, wherein said auxiliary attachment means passes through aligned apertures provided in each of said lower portion and said main body portion before making said releasable engagement with said column.

49. A system according to claim 48, wherein said auxiliary attachment means makes said releasable engagement with said internal wall portions of said column.

50. A system according to claim 49, wherein said internal wall portions comprise a first set of internal wall portions defining each said outer channel portion of each said channel and a second set of internal wall portions defining each said inner channel portion of each said channel.

51. A system according to claim 50, wherein said second set of internal wall portions are shaped and dimensioned to define at least one raised ridge therein.

52. A system according to claim 51, wherein said second set of internal wall portions comprises two internal wall portions arranged in substantially opposed parallel relation one to the other to define the width of said inner channel portion.

53. A system according to claim 52, wherein said at least one raised ridge is present on each of said two inner internal wall portions.

54. A system according to claim 53, wherein said at least one raised ridge comprises a plurality of raised ridges and wherein said auxiliary attachment means comprises one or more mounting screws dimensioned and otherwise adapted to engage said raised ridges in close-fitting relation therewith to make said releasable engagement with said internal wall portions of said column.

55. A system according to claim 54, wherein said outer surface of said column has a substantially circular transverse cross-sectional profile.

56. A system according to claim 55, wherein said inner channel portion is of substantially rectangular cross-section, with its major axis extending inwardly from said outer channel portion on a radial plane of said column.

57. A system according to claim 56, wherein said outer channel portion is of substantially rectangular cross-section with its major axis intersecting said major axis of the inner channel in substantially perpendicular relation thereto.

58. A system according to claim 57, wherein said at least one channel comprises two or more channels.

59. A system according to claim 58, wherein said two or more channels comprises eight channels.

60. A system according to claim 59, wherein said two or more channels are arranged in substantially congruent, evenly spaced circumferential relation about said vertical axis.

61. A system according to claim 46, wherein each said support arm member is dimensioned and otherwise adapted to accept in retained supported relation thereon one or more office furniture accessories selected from the group consisting of work surfaces, shelves, cabinets, bins, and drawers.

62. A system according to claim 61, comprising two or more of said support arm members, with two or more of said office furniture accessories being supported by respective ones of said two or more support arm members, so as to be oriented in juxtaposed relation to one another and to define a common wall panel space therebetween, wherein said common wall panel space is occupied by a panel constructed from a single layer of textile material, thereby to minimize the dimension of a space between said two or more of said office furniture accessories.

63. A system according to claim 62, wherein said single layer of textile material is a polyvinyl chloride mesh material.

* * * * *